Oct. 17, 1967  A. D'ONOFRIO  3,348,108
SYSTEM FOR REMOTELY CONTROLLING THE OPERATION
OF A PLURALITY OF MOTORS
Filed May 13, 1963                                  9 Sheets-Sheet 1

INVENTOR
Anthony D'Onofrio
BY
Rockwell, DeLio
ATTORNEYS

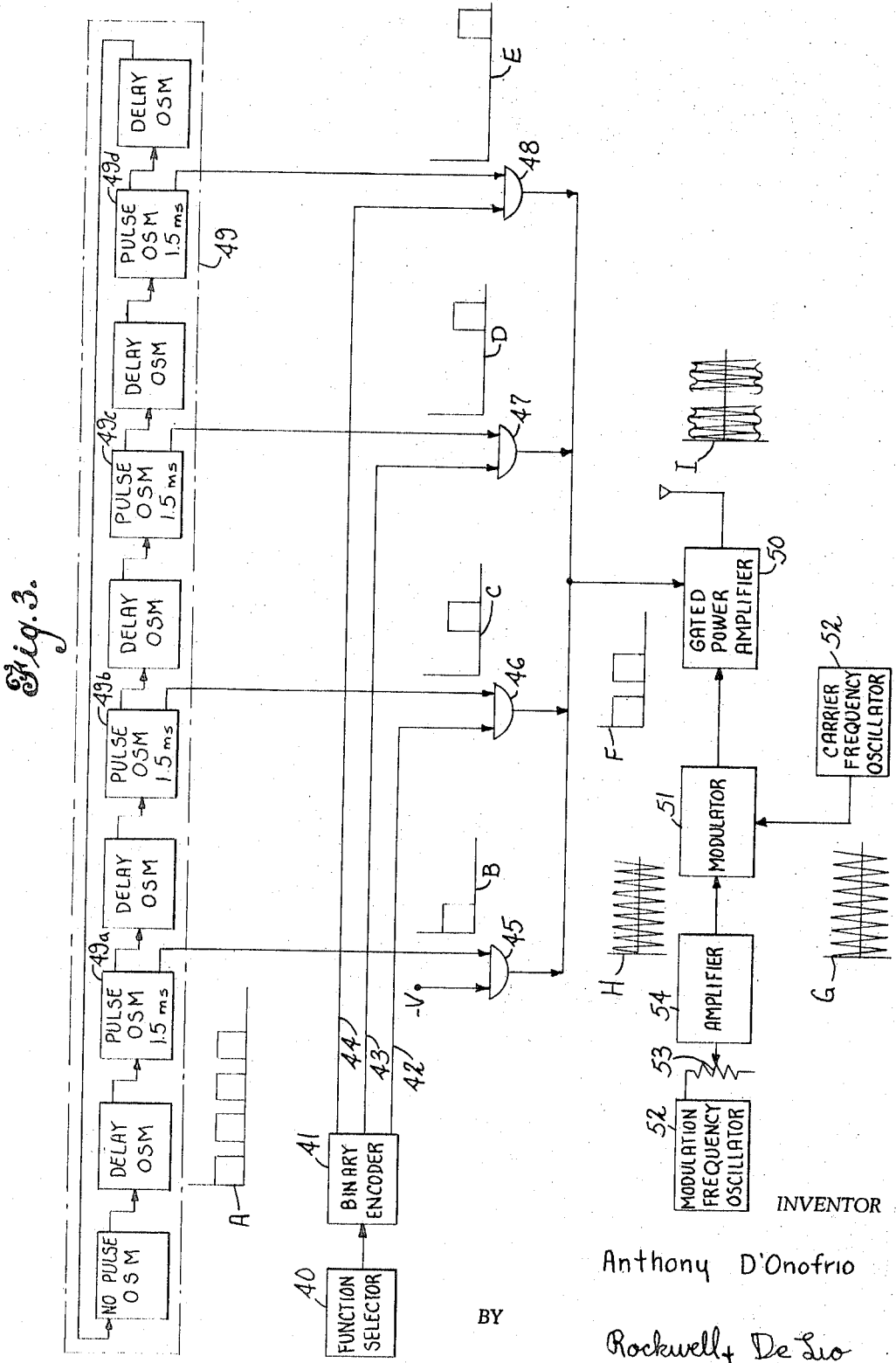

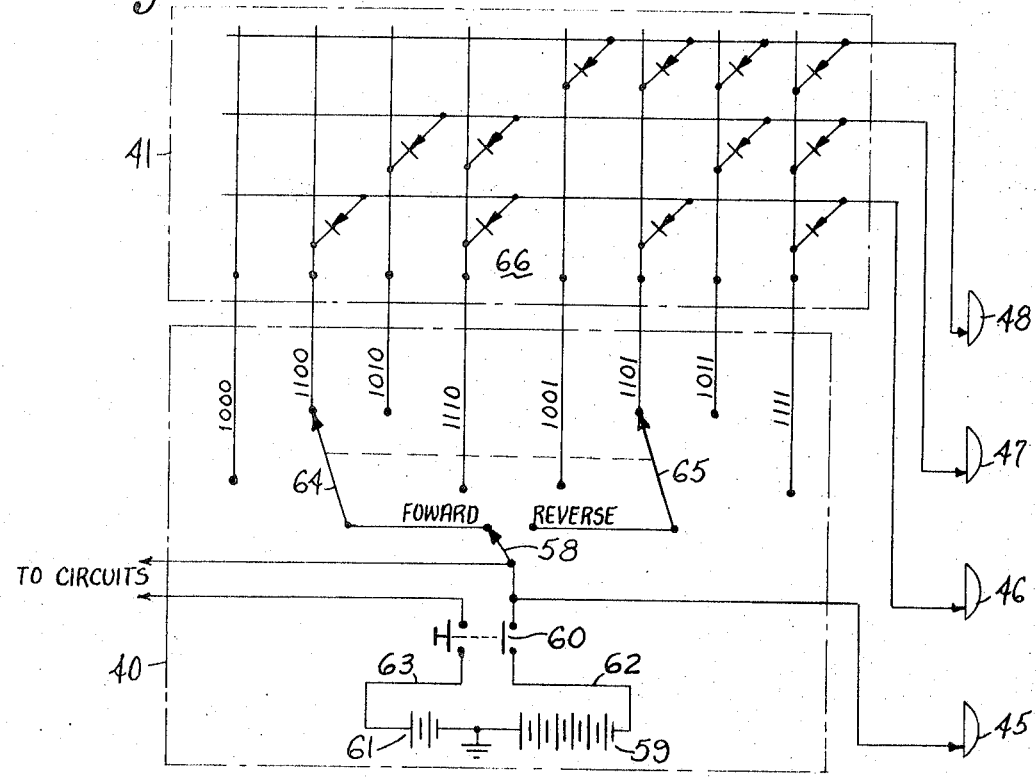
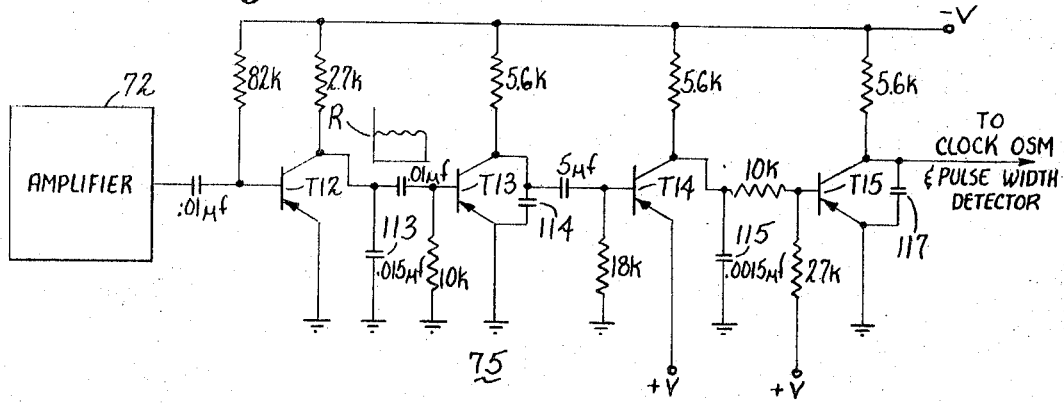

Oct. 17, 1967 A. D'ONOFRIO 3,348,108
SYSTEM FOR REMOTELY CONTROLLING THE OPERATION
OF A PLURALITY OF MOTORS
Filed May 13, 1963 9 Sheets-Sheet 4

INVENTOR
Anthony D'Onofrio
BY
Rockwell & De Lio
ATTORNEYS

INVENTOR
Anthony D'Onofrio
BY
Rockwell & De Lio
ATTORNEYS

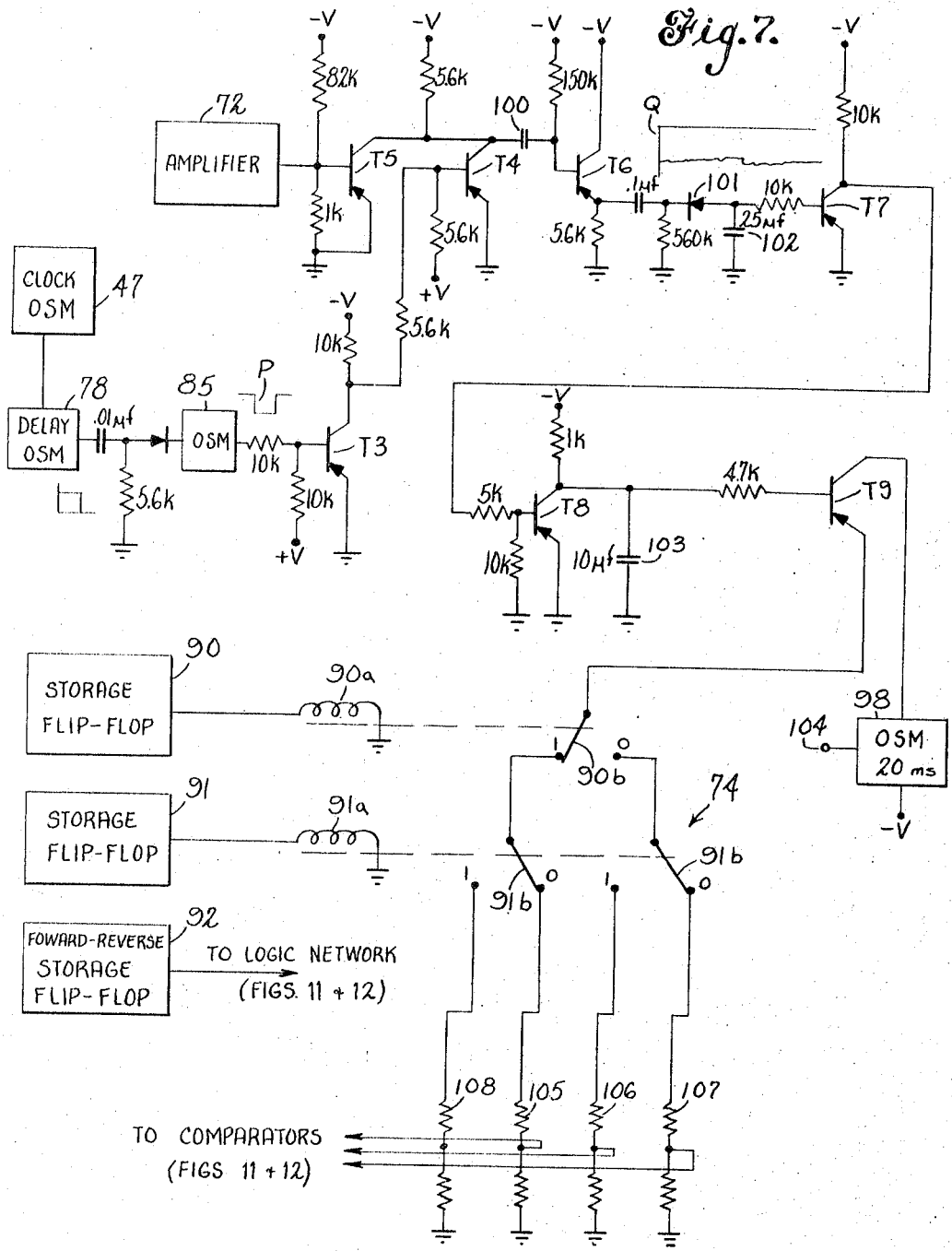

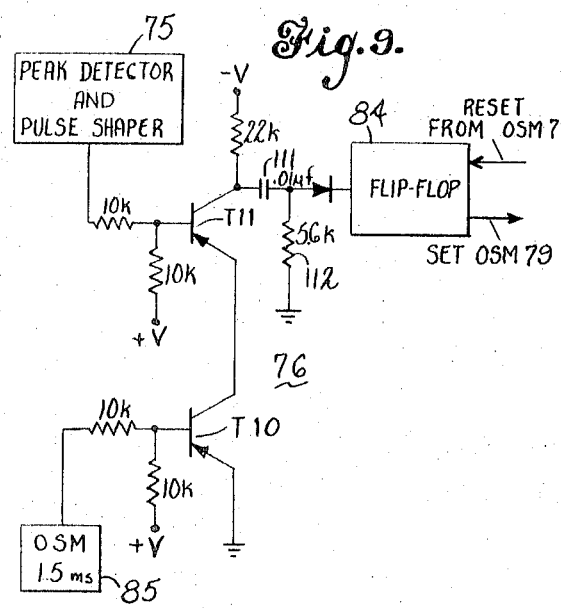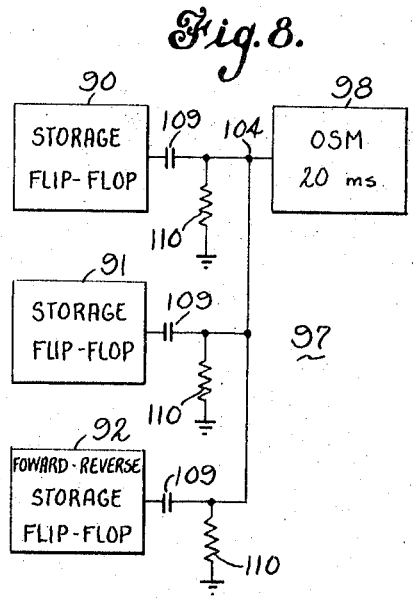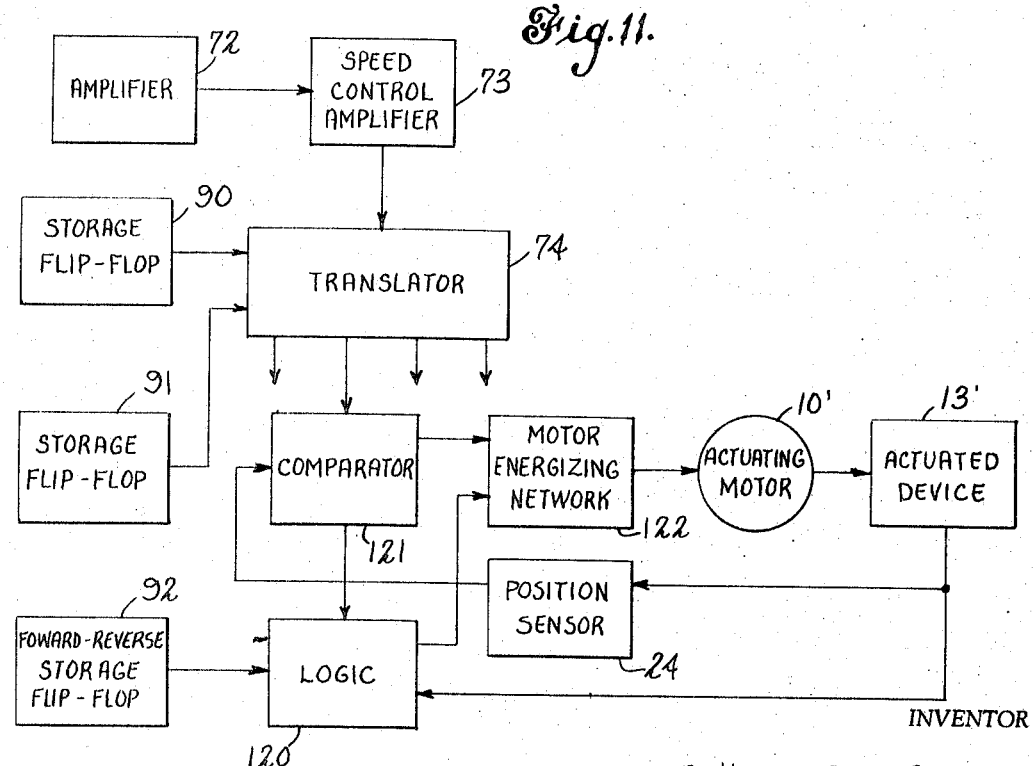

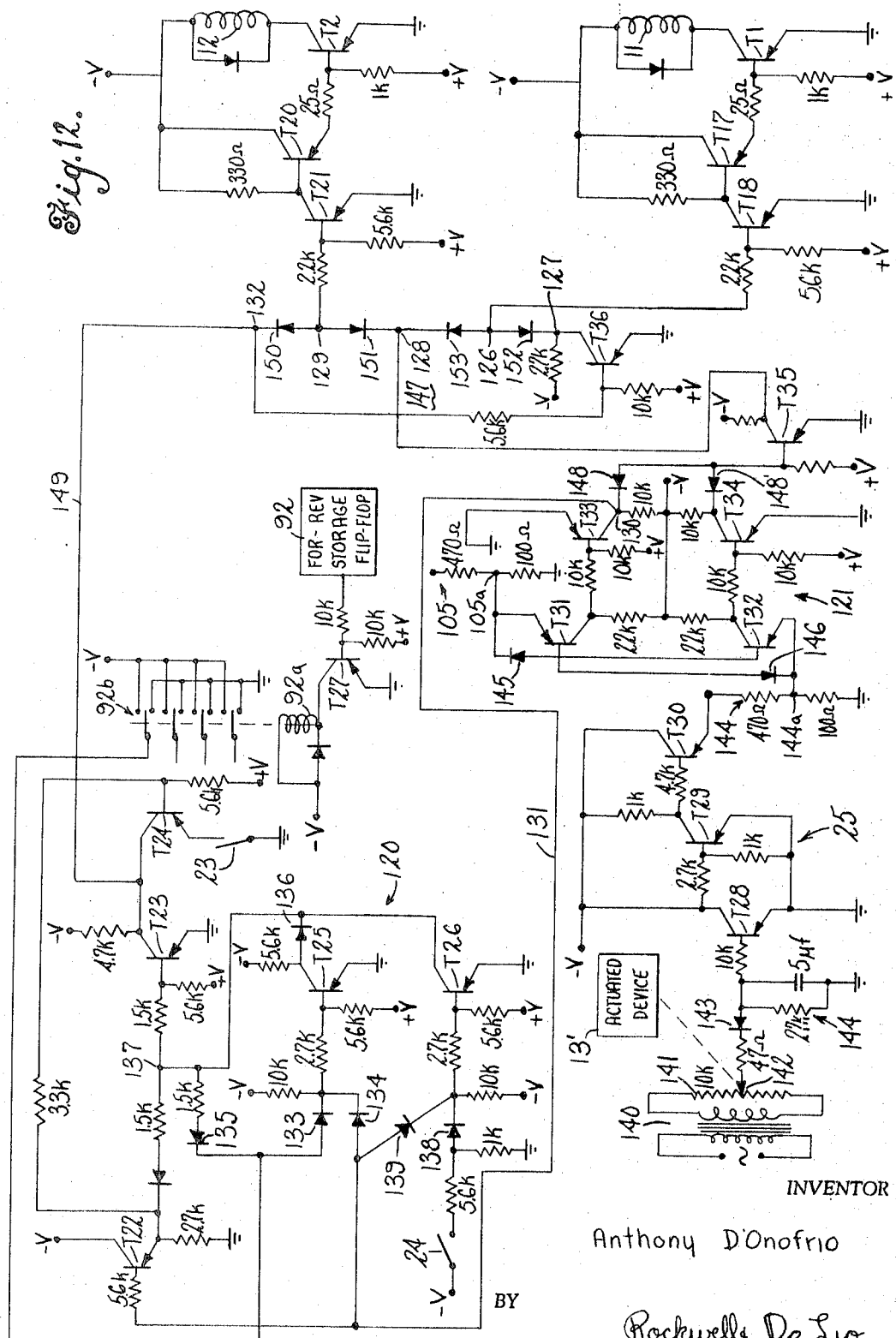

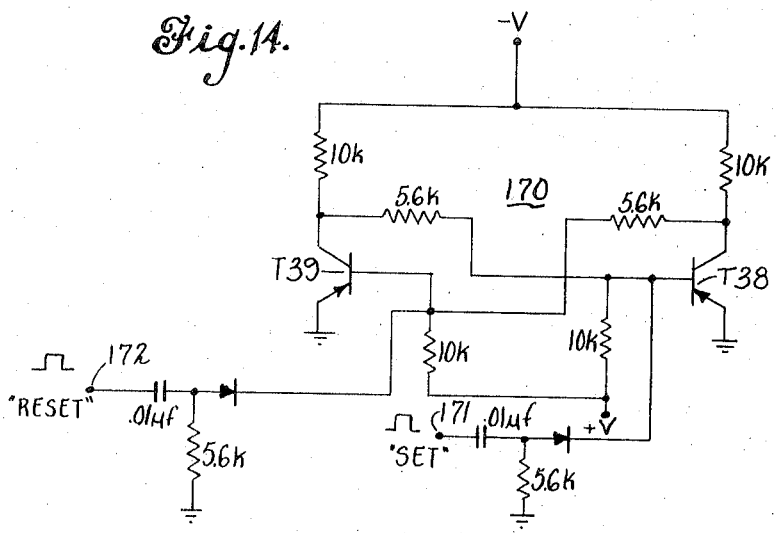
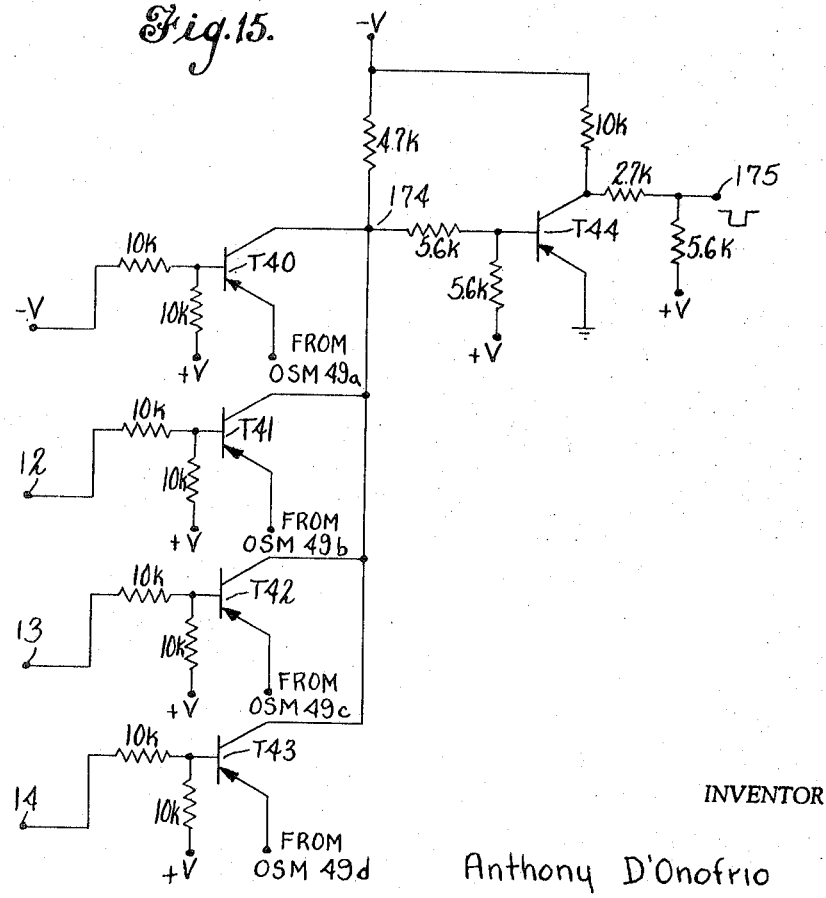

United States Patent Office 3,348,108
Patented Oct. 17, 1967

3,348,108
SYSTEM FOR REMOTELY CONTROLLING THE OPERATION OF A PLURALITY OF MOTORS
Anthony D'Onofrio, West Hartford, Conn., assignor to Pratt & Whitney Inc., Hartford, Conn.
Filed May 13, 1963, Ser. No. 279,962
27 Claims. (Cl. 318—16)

This invention relates to control systems and more particularly relates to a control system wherein an operator may control a plurality of functions or a plurality of degrees of movement of an apparatus from a remote or portable control station.

The invention is concerned with systems of the type wherein a plurality of command or control functions may be encoded and transmitted to a receiving device which detects the encoded command functions from the coded signals and translates the coded intelligence to a form which commands and controls various functions or degrees of movement of an object.

Remote control systems, for controlling a plurality of devices or degrees of motion of an object from a station remote from the controlled object, have been devised which utilize a transmitted carrier signal which is frequency modulated with a discrete frequency indicative of each individual command function to be performed. Such systems for the most part employ a technique often referred to as tone modulation or frequency shift keying. These systems have been proven technically feasible and in many instances have found industrial and commercial acceptance, in particular environments. However, these systems require a wide radio frequency band width due to the use of a plurality of discrete modulating frequencies. Moreover, the use of a plurality of discrete modulation frequencies requires a separate local oscillator and modulator in the transmitter for each modulating frequency and a discriminator in the receiver for each modulation frequency. This equipment, necessary for each modulating signal greatly accelerates the cost of a tone modulation remote control system. Additionally, expansion of such a system to perform added control functions requires additional equipment, as mentioned above, for each additional control function and further undesirably increases the overall frequency band width of the system.

The present invention, in contrast to the aforementioned multi-channel remote control systems, provides a remote control system using but a single communications frequency. A control system embodying the present invention may be termed a pulse code modulation system.

A system embodying the present invention may generally comprise transmitting means which transmits a plurality of pulse code patterns, each indicative of a desired function, and receiving means which receive, decode and translate such code patterns to control operation of a selected actuated device or degree of motion of a selected actuated device. For purposes of illustration, the invention will be discussed as applied to the control of a plurality of electric motors, each arranged to actuate a device or cause different degrees of movement of a device.

By way of example only, one installation in which the present invention may be utilized is in the control of the degrees of movement of an overhead crane. In such an installation, at least three degrees of motion must be controlled in forward and reverse directions, movement of the crane or boom along the length of a shop or other installation, movement of the bridge along the boom, and raising and lowering of the hook carried by the bridge. Using the present invention, the operator may remain on the floor of the shop and direct operations of the crane while in proximity to the work to be acted upon. In such utilization, the operators cab may be eliminated. Also, several cranes may be operated simultaneously by one operator from the same transmitter. While one environment for application of the invention has been described, many other applications may be made of the invention, some of which will hereinafter be pointed out.

In the present invention a fixed modulation frequency signal is encoded in what may be described as a binary pulse code so as to identify each of a plurality of control or command functions with a selected pulse code pattern. The selected pulse code pattern is reiteratively transmitted to a receiver. The receiver decodes and identifies the transmitted command function and converts and applies received signals to selected actuated devices. The invention further provides position control means for controlling the position of an actuated device and the speed or other characteristic of a device controlled thereby, code verification means which check received pulse patterns against previously received pulse patterns, lockout means which temporarily inhibit operation of a selected actuated device upon change of a code pattern, means for preventing undesired operation of the system or effect on the system by spurious or external radio frequency signals and means for returning an actuated device towards neutral or a preretermined position upon cessation of a pulse code pattern controlling operation of the actuated device.

The invention further provides new and improved logic means for selecting and controlling operation and direction of an actuated device, resetting of an actuated device to a predetermined position upon completion of a commanded function, verification and monitoring of position of an actuated device, and means for interrelating such information for precise and accurate operation of a system embodying the invention. The invention provides remote control systems which are expandable to control any number of functions or to handle any type of data transmission.

Moreover, a control system embodying the invention is relatively economical, and precise and accurate in operation.

Accordingly, an object of this invention is to provide a new and improved control system for controlling a plurality of degrees of motion of a controlled apparatus or a plurality of controlled apparatus.

Another object of this invention is to provide a new and improved control system of the pulse code modulation type.

Another object of this invention is to provide a new and improved control system for selectively controlling the operation of a plurality of actuated devices, and devices controlled thereby, such as electric motors.

Another object of this invention is to provide a new and improved control system for selectively controlling the operation of a plurality of actuated devices and devices controlled thereby by selecting the actuated devices through pulse code patterns transmitted by amplitude modulated carrier where the amplitude of the modulation signal determines the magnitude of displacement of the selected actuated device from a reference position.

Another object of this invention is to provide a new and improved control system arranged to control the operation of a plurality of devices through transmission and receipt of intelligence in reiterative pulse code patterns.

Another object of this invention is to provide a new and improved control system arranged to selectively control the operation or characteristic of a plurality of controlled devices.

Another object of this invention is to provide a new and improved control system which selectively controls the position of an actuated device, which dependent upon its controlled position, controls the operation or an operating characteristic of a controlled device.

Another object of this invention is to provide a new and improved control system of the type described which selectively controls the position of an actuated device which, dependent upon the magnitude of its displacement from a reference position, controls the operation or an operating characteristic of a controlled device and is further provided with means for automatically returning the actuated device to the reference position upon cessation of a transmission of a selected pulse code pattern.

Another object of this invention is to provide a new and improved control system for controlling the operation or operating characteristic of a plurality of electric motors and apparatus operated thereby where the operation or operating characteristic of the motors is determined by the magnitude of displacement of an actuated device from a reference position.

A further object of this invention is to provide a new and improved control system of the type described including logic means which stores information indicative of the operation and position of an actuated device and permits operation of the actuated device only under certain logical conditions.

A further object of this invention is to provide new and improved means for encoding and transmitting information to a control system to selectively control the operation of a plurality of devices.

A still further object of this invention is to provide a new and improved means for transmitting and decoding encoded intelligence.

A still further object of this invention is to provide a new and improved processing system for transmitting encoded command functions to means for selectively controlling the operation of a plurality of devices and which, both singly and collectively, includes new and improved means for continuously verifying the continuity and validity of reiteratively transmitted intelligence in the form of pulse code patterns, means for disabling operation of an actuated device upon cessation of a reiterative transmitted intelligence, means for automatically returning an actuated device to a reference position upon cessation of a reiteratively transmitted pulse code pattern, and logic means for monitoring and exerting supervisory control over operation of each actuated device.

Other objects and advantages of the invention will hereafter, in part, be pointed out and, in part, be made apparent.

The features of the invention which are believed to be novel are pointed out with particularity and distinctly claimed in the concluding portion of this specification. However, the invention, both as to its organization and operation, together with the cooperation of the elements comprising a preferred embodiment of the invention may best be appreciated by referring to the following detailed disclosure, taken in conjunction with the drawings wherein:

FIG. 3 is a diagram, in block form, of a pulse code modulation transmitting unit utilized in a system embodying the invention;

FIG. 4 is a schematic diagram of the function selector and encoder of FIG. 3;

FIG. 5 is a diagram, in block form, of a receiver, decoder and translator arranged to receive, decode and translate the output of the transmitter of FIG. 3;

Figure 13:
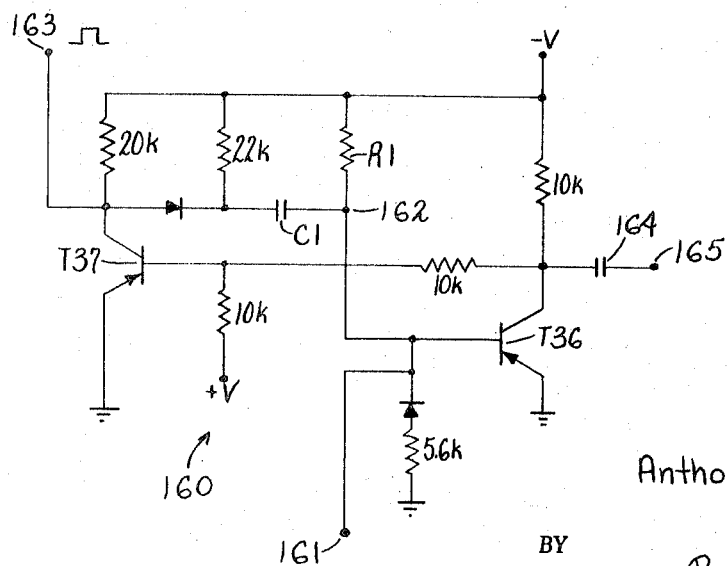

FIG. 7 schematically illustrates the speed control amplifier and translator shown in block form in FIG. 5;

FIG. 8 is a diagram, partly schematic and partly in block form of a code verification arrangement utilized in the system of FIG. 5;

FIG. 9 schematically illustrates a pulse width detector shown in block form in FIG. 5;

FIG. 10 is a schematic diagram of the peak detector and pulse shaper of FIG. 5;

FIG. 11 illustrates in block form the logic networks utilized in a system embodying the invention;

FIG. 12 illustrates, schematically, a preferred arrangement of the logic networks of FIG. 11;

FIG. 13 is a schematic diagram of an exemplary one-shot multivibrator which may be utilized in the disclosed system;

FIG. 14 is a schematic diagram of an exemplary flip-flop which may be utilized in the disclosed system; and FIG. 15 is a schematic diagram of an exemplary "and" or coincident gate arrangement which may be utilized in the disclosed system.

*General arrangement and applications*

To disclose a preferred embodiment of the invention, a remote control system embodying the invention will be described generally, first in system form, with some applications therefor. Thereafter various component systems forming an embodiment of the invention will be described, together with electrical waveforms that occur at various points in the system. In the various illustrations of electrical waveforms given, time is the ordinate and voltage is the abscissa. Upon general description of the system and its illustration in block form, specific examples of components comprising an embodiment of the invention will be disclosed, where necessary, to further facilitate an understanding of the invention and to illustrate exemplary embodiments and applications thereof.

Figure 1:
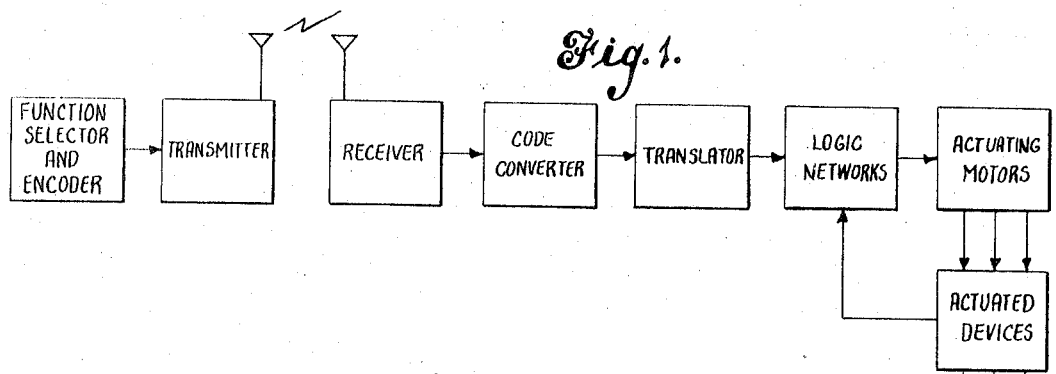
FIG. 1 is a diagram in block form of a remote control system in which the invention may be embodied, set forth for purposes of orientation.

Reference is first made to FIG. 1, for purposes of orientation, which illustrates a control system which may embody the invention. In the system of FIG. 1 means are provided for selecting a command function and encoding such command function, applying the encoded command function to a transmitter where it is transmitted on a carrier-frequency signal. A receiver receives the transmitted encoded command function, detects the encoded command function from the carrier wave and applies the encoded command function to a code converter. The code converter then transmits the selected command function to a translator which translates the coded signal to a signal operable to cause energization of a selected actuating motor. The output of the translator is applied to logic networks of the selected actuating motor, which compares the position and other characteristics of the actuated device operated by the selected acutating motor with the command function, as will hereinafter be described. The translator and logic networks cooperate to predetermine actuation and operation of selected ones of a plurality of actuating motors which produce movements of an actuated device to a desired position. Servo means are provided for monitoring and controlling the position of the actuated device and the speed or other characteristics of devices controlled by the actuated device through operation of the translating and logic networks as will hereinafter be described.

A control system embodying the invention may be utilized to control the operation or characteristics of many different types of apparatus. For purposes of disclosure, the invention will be described as applied to control of operation of an apparatus having three degrees of movement, more specifically an overhead crane.

Figure 2:
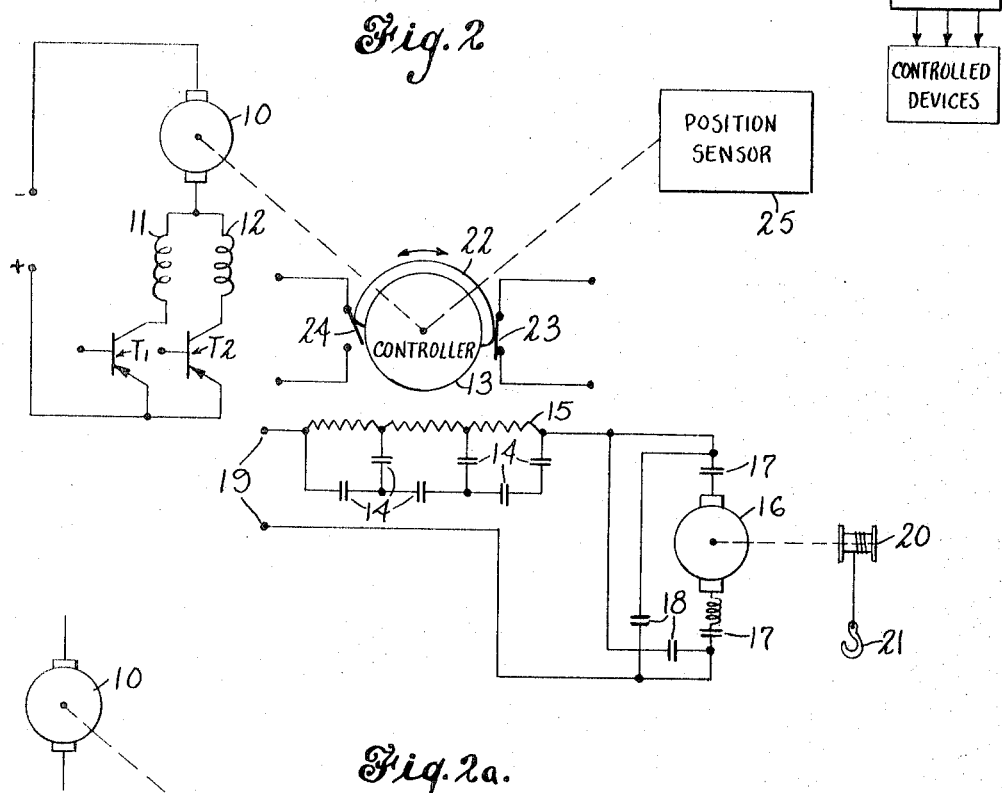
FIGS. 2 and 2a are diagrams, partly in schematic of electric drive motors and devices actuated thereby which may be controlled by a control system embodying the invention.

One of a plurality of actuating motors 10 of a crane control system is illustrated, FIG. 2, together with the actuated device it operates. The actuating motor illustrated, is one for controlling the operation of a drive motor which in turn operates the hook of an overhead crane. Other actuated apparatus of an overhead crane would comprise a crane or boom, and a bridge, together with driving motors and controls therefor.

An actuating motor 10, illustrated as a split-field series motor, is arranged to be selectively connected to a source of electric energy through forward and reverse series fields 11 and 12, respectively. Each of series fields 11 and 12 has connected in circuit therewith a switch, illustrated as transistors T1 and T2. Fields 11 and 12 are oppositely wound, and transistors T1 and T2 are selectively rendered conductive to control the direction of rotation of motor 10.

Motor 10 drives an actuated device, illustrated as controller 13, having contacts, not shown, adapted upon movement of controller 13 to selectively open and close contactors 14 to vary the resistance 15 in circuit with a drive motor 16 and thereby vary the armature voltage and hence the speed of motor 16. The armature voltage and hence the speed of motor 16 is dependent on the position of controller 13. Controller 13 also, dependent on the direction of movement thereof, selectively opens or closes forward and reverse contactors 17 and 18, respectively, to determine the direction of rotation of motor 16. Motor 16 is arranged to receive electric power from terminals 19 connectable to a suitable source of electric power.

As illustrated, motor 16 is arranged to reversibly drive a pulley 20 and control the speed of raising and lowering hook 21 of a crane. It will be understood that a control system embodying the invention is capable of control of the operation of a plurality of drive motors, such as motor 16, and the arrangement of FIG. 2 is set forth primarily for exemplary purposes. The control of drive motor 16 is one which will be readily recognized by one skilled in the art. Controller 13 may take any suitable form, such as a drum, a cam shaft or a linearly movable device which will selectively operate contactors 14 to control the speed of drive motor 16.

In accordance with one aspect of the invention, as hereinafter explained, means are provided for sensing the forward-reverse position of the actuated device and the magnitude of displacement thereof from a neutral or reference position. Such means may comprise a cam or projection 22 on controller 13 which operates forward and reverse sensing means, such as switches 23 and 24, respectively, and a position sensor 25 which determines the magnitude of displacement of controller 13 from a neutral or reference position, as hereinafter explained.

Figure 2A:
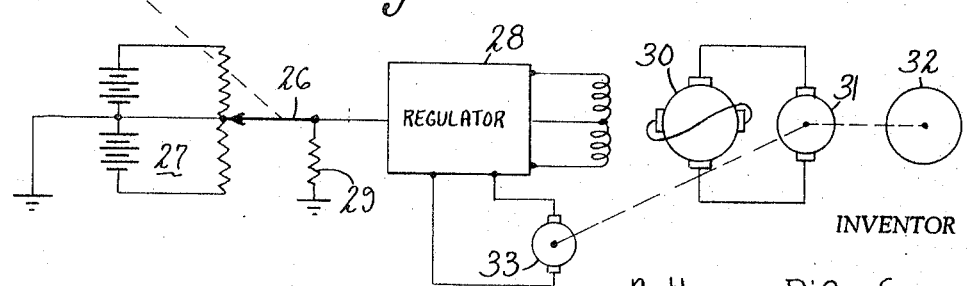

The drive system of FIG. 2 is particularly adapted for controlling the speed of operation of a driven apparatus, hook 21. However, a control system embodying the invention may be utilized in many different applications. For example, it may be utilized to control the operation of a plurality of electric drive systems as exemplified in FIG. 2a, which illustrates a speed regulated electric drive. Actuating motor 10 is arranged to position a potentiometer arm 26, which supplies a speed reference signal derived from a source of reference potential 27 to a regulator or preamplifier 28. Regulator 28 has applied thereto a positive or negative reference voltage, dependent on the direction of positioning of arm 26, which voltage appears across resistor 29. Regulator 28, dependent on the polarity of the reference voltage, controls the polarity of the output of a power amplifier 30, illustrated as a two field, cross flux excited generator, which in turn determines the magnitude of the voltage and polarity thereof applied to a drive motor 31, arranged to drive a load 32. The electric drive system of FIG. 2a, is arranged to regulate a motor characteristic such as speed, torque or horsepower. As illustrated, the regulated characteristic is motor speed, sensed by a tachometer generator 33 and compared with the reference signal across resistor 29 in regulator 28. The drive system of FIG. 2a will be readily recognized as conventional by one skilled in the art, and it may be arranged to regulate speed, torque or horsepower of motor 31.

It will be apparent that the position of arm 26 may be monitored by detecting the polarity and magnitude of the voltage appearing across resistance 29, which may also be indicative of the magnitude and direction of the regulated characteristic of motor 31. It will be understood that while a control system embodying the invention may be utilized to control operation of drive systems as described and illustrated in FIGS. 2 and 2a, it has facility for controlling the operation of a wide range of drive systems including both electrical and electro-hydraulic.

*Transmitter*

In practicing the invention, a command or control signal indicative of an operation to be performed is generated in the form of a pulse code pattern and transmitted to and through receiving means hereinafter described to a selected one of a plurality of actuating motors which controls performance of the selected function. In accordance with the invention a generated pulse code pattern contains three items of intelligence; the actuated device to be operated, the direction of operation and the position to which it will be operated.

The manner in which a coded signal indicative of a selected function to be performed by an actuating motor is generated and transmitted is first described. A pulse code transmitter illustrated in FIG. 3 comprises a function selector 40 which, as hereinafter described, enables an operator to select functions to be performed or selectively control operation of any of a plurality of actuating motors as illustrated in FIGS. 2 and 2a. The selected function is then encoded in an encoder 41 which selectively energizes lines 42, 43 and 44 in accordance with the selected code. A plurality of parallel coincidence or "and" gates 45, 46, 47 and 48 are provided and gates 46, 47 and 48 are arranged to receive a gating signal from lines 42, 43 and 44, respectively dependent upon the information encoded in encoder 41. A gating signal indicated as $-V$ is continuously applied to gate 45.

A four-bit, serial pulse generator 49 is provided to reiteratively generate pulse patterns, and comprises a series of one-shot multivibrators (OSM) which generate a pattern of four pulses as illustrated at A. The serial pulse generator may comprise alternate pulse generating OSM's and delay OSM's, together with a pulse spacing OSM which provides spacing between the four pulse patterns. Alternatively, the delay OSM's may be eliminated and the spacing between pulses provided by the inherent delay of the multivibrator circuitry. As illustrated, gates 45, 46, 47 and 48 receive sequentially a pulse from one-shot multivibrators 49a, 49b, 49c and 49d, respectively, in that order. It will be apparent that gate 45 will always pass the pulse generated by one-shot multivibrator 49a, for reasons hereinafter described, and gates 46, 47 and 48 will pass pulses dependent upon energization of lines 42, 43 and 44 from encoder 11.

In the illustrated transmitter, the time relation of the application of pulses generated by OSM's 49a, 49b, 49c and 49d to gates 45, 46, 47 and 48. respectively, is exemplified by the waveforms B, C, D and E. The output of this parallel gate arrangement is illustrated at F and comprises a two-pulse code pattern which corresponds to a 1100 binary number in a four pulse pattern, indicating that line 42 is energized and lines 43 and 44 are not energized by encoder 41.

The output of the parallel "and" gates is utilized to gate a power amplifier 50 which receives an input from a modulator 51 which modulates a carrier frequency signal from a carrier frequency oscillator 52 with a modulation frequency signal from a modulation frequency oscillator 53. The output of modulation frequency oscillator 53 is applied to modulator 51 through an amplifier 54 and the modulation frequency oscillator 53 is provided with means, illustrated as a potentiometer 55, to control the amplitude of the modulation frequency signal and hence the degree of modulation of the carrier wave. The carrier frequency signal G is modulated with the modulation frequency signal H in modulator 51 and applied to power amplifier 50. Amplifier 50 is gated by the output of the parallel gates in accordance with a selected code and thereby provides a transmitted output in accordance with the selected pulse pattern. The output of power amplifier 50 for a 1100 code pattern is illustrated at I.

The specific arrangement of the oscillators, modulator, amplifier and power amplifier in the radio frequency portion of the transmitter of FIG. 3 may be of any suitable design and need not be specifically described. It is preferred that the carrier frequency be within the Citizens Band frequency. In fact, one embodiment of the invention has been constructed using the radio frequency elements of a commercially available Citizens Band transceiver, operating at 27.025 megacycles in both the transmitting and receiving networks. The modulation frequency in this instance was 10 kilocycles.

A preferred form of the selector 40 and encoder 41 are illustrated in FIG. 4. Selector 40 comprises a forward-reverse selector switch 58 connectable to a source of negative unidirectional potential, illustrated as a battery 59. The connection of forward-reverse selector switch 58 to the negative terminal of battery 59 is through a system off-on switch 60 which may be a so-called "dead man's switch" and which may be considered optional. Switch 60 must be closed in order to energize the system. It will be noted, that, as illustrated, selector 40 also provides a source of positive unidirectional potential 61 illustrated as a battery. Leads are taken from the negative terminal of battery 59 and the positive terminal of battery 61 over lines 62 and 63, respectively, to furnish operating voltages for the transmitter.

The forward-reverse terminals are connected to switch arms 64 and 65 which are ganged. Switch arms 64 and 65 are adapted to selectively engage terminals of a diode-matrix encoder, generally identified by the reference numeral 66 to supply a selected combination of gating signals to gates 46, 47 and 48 and thereby produce a predetermined pulse code pattern for transmission. The selected functions are encoded in a binary form by the diode matrix 66. The binary number representation of each pulse code pattern is noted beside each switch contact. The pulse code 1100 is transmitted to the "and" gates. The function selected and encoded in binary form 1100 may be considered to be a command for forward operation of one of a plurality of actuating motors as exemplified by motor 10, FIG. 2. Correspondingly, the function 1101 would be a command to drive the same actuating motor in a reverse direction.

The pulse code patterns generated are referred to as "binary" inasmuch as the figure "1" represents the presence of a pulse in a pulse code pattern and "0" represents the absence of a pulse in a pulse code pattern. No numeric value is assigned to the binary representation of the pulse code patterns.

In the embodiment of the invention thus far disclosed, it will be seen that eight code patterns may be transmitted which may be utilized for forward and reverse operation of four actuating motors or other actuating devices. However, it is preferred not to use a 1000 pulse code pattern, therefore the system, as thus far described, may be arranged to control forward-reverse operation of three actuating motors or other actuating devices with an additional command function available, pulse code pattern 1001. It will be apparent that the system may be expanded to handle more command functions by addition of another OSM in the serial pulse generator, another "and" gate and corresponding diodes in encoder 41.

"And" gate 45, by virtue of its connection to the negative terminal of unidirectional source 59 is energized whenever switch 60 is closed and will pass each pulse generated by OSM 49a. As hereinafter explained, the absence of this first pulse in a code pattern will prevent operation of the controlled devices.

It will be noted that each pulse code pattern selected when switch 58 is in the reverse position, ends with a pulse as indicated by "1." It will be further noted that when switch 58 is in the forward position, any pulse code pattern generated and transmitted will end with a pulse absence, as indicated by "0." Therefore, the presence or absence of a pulse at the end of a pulse code pattern determines whether a forward or reverse command function is transmitted. In this respect, the pulse code patterns 1101, 1011 and 1111 indicate similar but reverse command functions to pulse code patterns 1100, 1010 and 1110, respectively. Thus, in the case of the chosen example of an overhead crane, a 1100 pulse pattern may indicate that hook 21, FIG. 2, is to be lowered and a 1101 pulse pattern would indicate that hook 21 is to be raised. The pulse patterns 1010, 1011 and 1110, 1111 would indicate similar information for the operation of the boom and bridge of the crane.

As will hereinafter be made apparent, the first pulse of a pulse code pattern is always present and is utilized for code verification and position or speed control information, the last pulse of a pulse code pattern or absence thereof determines a direction of operation, and the remaining intermediate pulses of absence thereof are utilized to select a particular device, of a plurality of devices, to be actuated.

It will be understood that the term "pulse code pattern," as applied to the operation of the disclosed system refers to a four pulse code pattern including a pulse code pattern lacking one or more pulses, for example 1101.

*Receiver, code converter and translator*

The modulated pulse code pattern generated by the transmitter of FIG. 3 is reiteratively transmitted, and received by the receiving and code converting apparatus of FIG. 5. The reiterative modulated pulse code pattern is received by a receiver 70 where the modulation frequency signal is detected and applied through a modulation frequency filter 71 to an amplifier 72. The output of amplifier 72 is shown at waveform J, FIGS. 5 and 6, and comprises pulses or brusts of the modulation frequency signal of an amplitude determined by the setting of the arm of potentiometer 55 (FIG. 3) and of a pattern determined by encoder 41, in the instance under discussion, a 1100 pattern, which is reiteratively illustrated in FIG. 6. In accordance with the invention, the pulse output of amplifier 72 is applied to a speed control amplifier 73 where it is converted to a unidirectional voltage proportional in magnitude to the amplitude of the modulation frequency signal. The speed control amplifier 73 is sensitive only to the first pulse of a code pattern. The output voltage of the speed control amplifier 73 is then applied through a translator 74, as will hereinafter be explained, to a selected actuating motor. Although the signal output of amplifier 73 is spoken of as a speed control signal and amplifier 73 as a speed control amplifier, the output signal of amplifier 73 determines the commanded position of an actuated device which in turn controls the speed or other characteristic of a controlled device, dependent on its displacement from a reference or neutral position.

Figure 6:
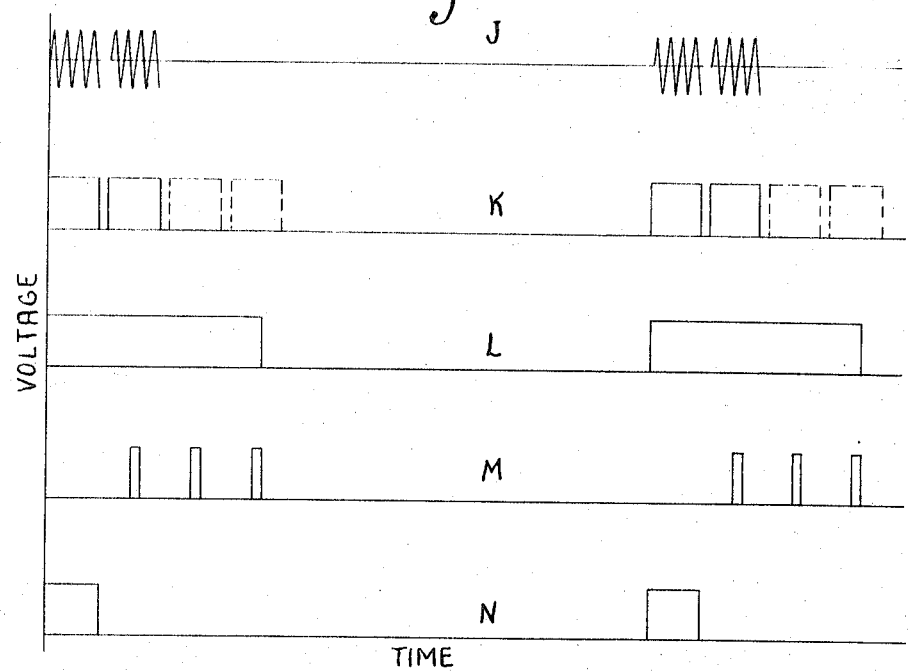
FIG. 6 illustrates graphically, the waveforms occurring at different locations in the system of FIG. 5 during operation thereof.

The output of amplifier 72 is also applied to a peak detector and pulse shaper 75 which converts the pulses or bursts of modulation frequency signal, waveform J, to rectangular pulses, waveform K, FIG. 6, in accordance with the output of the gates 45, 46, 47 and 48 (FIG. 3). The rectangular pulse output of peak detector and pulse shaper 75 is simultaneously applied to a pulse width detector 76 and a clock OSM 77. The first pulse of a pulse code pattern triggers clock OSM 77, which initiates a serial pulse pattern from a serial pulse generator comprising alternate delay OSM's and interrogate OSM's, 78 through 83. Clock OSM 77, upon receipt of the first pulse of a code pattern will generate a blanking pulse as shown at waveform L, FIG. 6, to prevent actuation of the serial pulse generator until a succeeding pulse code pattern is received. When clock OSM 77 is triggered, it supplies a triggering signal to delay OSM 78 which initiates timing and generation of the serial interrogate pulse pattern, shown in waveform M, FIG. 6, by the delay and interrogate OSM's 78–83. Triggering of clock OSM 77 also supplies a resetting signal to a flip-flop 84, and triggering of delay OSM 78 supplies a triggering signal to OSM 85 which upon firing thereof gates speed control amplifier 73 to receive the first pulse or burst of the detected modulation frequency signal, waveform I, as hereinafter explained. When OSM 85 is fired, it also supplies a pulse to pulse width detector 76, as shown in waveform N, FIG. 6. The pulse output of one-shot multivibrator 85 will coincide with the application of the first shaped pulse of a received pulse code pattern, waveform K. If the first shaped received pulse is not of at least a predetermined minimum width, determined by the width of the pulse output of OSM 85, pulse width detector 76 will set flip-flop 84 to inhibit firing of interrogate OSM 79.

When flip-flop 84 is set in a predetermined conducting condition by pulse width detector 76, it will not allow firing of interrogate OSM 79. Should the pulse input to pulse width detector be of a width less than that predetermined by OSM 85, pulse width detector 76 will set flip-flop 84, and interrogate OSM 79 will be inhibited from firing even though a firing signal is received from delay OSM 78. At the end of each clock pulse, waveform K, clock OSM 77 resets flip-flop 84 to a state such that it may be set again if pulse width detector 76 determines that a pulse is less than a predetermined minimum width.

The provision of pulse width detector 76, together with associated components, namely flip-flop 84 and OSM 85, prevents generation of a serial interrogate pulse pattern, unless the first of the pulses of a code pattern is of a predetermined minimum width. In this manner means are provided for verifying the validity of a pulse code pattern. As will be recalled, "and" gate 45 is always gated to pass the first pulse of a serial pulse pattern and initiate a pulse code pattern. This pulse code pattern verifying means protects the serial pulse generator comprising delay and interrogate OSM's 78–83 against actuation by a spurious pulse or pulse originating without the system.

It will be noted that firing times or unstable states of OSM's 77–83 and 85 are noted in milliseconds, however, it will be understood that the values illustrated, are merely given for purposes of illustration in conjunction with the waveforms of FIG. 6 and to facilitate an understanding of the invention.

The output pulses of the interrogate OSM's 79, 81 and 83 are applied to parallel "and" gates 86, 87 and 88, respectively. Also, the pulse output of peak detector and pulse shaper 75 is applied serially to gates 86, 87 and 88 through an inverter 89. The output of peak detector and pulse shaper 75 is exemplified by reiterative waveform K (FIG. 6) and illustrates a code pattern representing a reiterative 1100 code (the last two pulses of a four pulse pattern are shown in broken line for clarity of illustration although not actually present in a 1100 code pattern). Since the first pulse of a code pattern transmitted by the transmitter of FIG. 3 is used solely for purposes of identification and verification and for speed or position control intelligence, only the latter three pulses of a four pulse code pattern generated and transmitted by the transmitter arrangement of FIG. 3 are utilized to select a particular actuating device and its direction of operation.

The output of inverter 89 which, in the illustrated embodiment of the invention, comprises a code pattern of a maximum of four pulses or selected combinations thereof which are serially applied to parallel "and" gates 86, 87 and 88, and upon coincidence of the interrogate pulses of waveform L and the received and shaped pulses of waveform J, gates 86, 87 or 88 will be actuated. As illustrated, there will be no received and shaped pulses in waveform K coinciding with the pulses of interrogate OSM's 81 and 83. Therefore, only gate 86 will be actuated which sets a storage flip-flop 90. Storage flip-flops 91 and 92 will not be set. The pulse output of inverter 89 is also applied to an inverter 93. Inverter 93 supplies a serial pulse pattern of a maximum of four pulses, waveform J, to "and" gates 94, 95 and 96 which have their outputs connected to storage flip-flops 90, 91 and 92, respectively. Also, interrogate pulses are applied to gates 94, 95 and 96 from interrogate OSM's 79, 81 and 83, all respectively. The first pulse of a transmitted code pattern has no effect on the operation of gates 86–88 and 94–96 since the interrogate pulses from OSM's 79, 80 and 81 occur later in time.

From the foregoing description, it may be seen that the storage flip-flops 90, 91 and 92 are set in a conductive state determined by the received code pattern. However, by virtue of the provision of inverter 93 and "and" gates 94, 95 and 96, storage flip-flops 90, 91 and 92 will be reset if there is a change in the transmitted code pattern. The conditions or states of storage flip-flops 90, 91 and 92, which are indicative of the transmitted pulse code pattern, are sensed as hereinafter explained.

In accordance with the invention, means are provided for continuously verifying a reiteratively transmitted pulse code pattern. Means are additionally provided for sensing a change of state of any of the storage flip-flops 90, 91 and 92, and further means are provided responsive thereto for disabling the speed control amplifier and removing its signal from translator 74 should there be a change in the received code pattern. The outputs of each of the storage flip-flops 90, 91 and 92 are applied to speed control lockout means 97 which senses any change in the state of the storage flip-flops, and upon sensing such change, disables the speed control amplifier by applying a firing signal to a one-shot multivibrator 98, which disables speed control amplifier 73. When speed control amplifier 73 is disabled it prevents any signal from being transmitted through speed control amplifier 73. This prevents any signal from being transmitted through translator 74 to an actuated device, and a selected actuated device will be automatically returned toward a neutral position, as will hereinafter be explained.

The arrangement of speed control amplifier 73 and translator 74 is shown in more detail in FIG. 7. When OSM 85 is fired by delay OSM 78 it applies a negative pulse P to the base of transistor T3 which gates transistor T3 into a conductive condition. When transistor T3 is gated on its collector it is essentially connected to ground as is the base of normally on transistor T4. Therefore, transistor T4 is turned off. When transistor T4 is turned off, normally blocked transistor T5 will amplify the negative portion of the incoming pulses, waveform J, of the modulation frequency signal from amplifier 72. However, it will be recalled that transistor T3 is gated only by the first pulse of a received pulse pattern. Therefore, only the first pulse of a received modulation frequency pulse code pattern is applied to the base of transistor T5 to render it conductive. When transistor T5 becomes conductive to amplify the incoming modulation frequency signal, that is, the negative portion thereof, the amplified signal is applied through a coupling capacitor 100 to the base of transistor T6 which is connected in an emitter-follower arrangement. The voltage appearing across the emitter resistance of transistor T6 is thus applied to a peak detector comprising a diode 101 and a capacitor 102 which detects the negative peak of the modulation frequency pulse with a resulting waveform Q. The detected voltage is then applied to the base of transistor T7 which is a direct current amplifier and hence to normally on transistor T8 which is also a direct current amplifier having a spike removing capacitance 103 connected to ground from the collector thereof. A signal of positive polarity across the collector resistance of transistor T7 decreases the conductivity of transistor T8. As transistor T8 becomes less conductive, the base of transistor T9 goes toward —V thereby increasing the conductivity of transistor T9. In this manner the conductivity of transistor T9 is varied as a function of the amplitude of the modulation frequency signal. It will be apparent that, if, for any reason, there is no transmitted signal or a failure of the transmitter, or if for any reason, the first pulse of a transmitted code pattern is not received, speed control amplifier 73 will be rendered inoperative.

Transistor T9 is connected as an emitter follower with voltage dividers of translator 74 supplying the emitter load resistance.

The collector of transistor T9 is connected to —V through OSM 98 when OSM is in a stable state. However, should OSM 98 be triggered to an unstable state by application of a firing signal to terminal 104, the collector of transistor 79 will be placed at ground and no speed control voltage will appear across the voltage dividers. In this manner, the speed control signal may be locked out for a predetermined time interval determined by the period of the unstable state of OSM 98. Means are thus provided for disabling speed control amplifier 73.

Translator 74, as illustrated, my comprise a tree of switches which are set in predetermined states by the condition of storage flip-flops 90 and 91. Relays 90a and 91a are operatively connected to storage flip-flops 90 and 91 to sense the conductive states thereof. When storage flip-flops 90 and 91 are set in a state representative of the existence of a pulse (binary "1") at a particular position in a pulse code pattern, the relays 60a and 61a, controlled thereby, are energized and move their controlled switch arms 90b and 91b, respectively, to contact a terminal indicative of a binary one state. As illustrated, the switch arms are set in accordance with the second and third pulses of a four pulse code pattern, a "10" code pattern which corresponds to a 1100 or 1101 transmitted code pattern. As previously explained, the first pulse of a code pattern although always present is not used in transmitting actuated device selection intelligence and the last pulse is utilized for directional control of the selected actuated device. As illustrated, a circuit corresponding to a 1100 or 1101 code pattern is provided from ground through voltage divider 105, a switch arm 91b, and switch arm 90b to a negative voltage through transistor T9 and OSM 98. Dependent on the states in which the storage flip-flops are set, any of voltage dividers 105, 106, 107 or 108 may be connected to the emitter of transistor T9. Dependent on the selection of these connections by the storage flip-flops, one of a plurality of actuated devices of a system, as illustrated in FIGS. 2 and 2a, may be operated to perform a commanded function. As hereinafter explained, the state of flip-flop 92 will determine the directional mode of operation of the selected actuated devices. The voltage magnitude appearing across a selected voltage divider will be proportional in magnitude to the desired position of a selected actuated device and the speed of a device operated thereby.

As determined by the pulse code pattern from the transmitter of FIG. 3, storage flip-flops 90, 91 and 92 will be set in predetermined states indicative of a commanded function and a voltage will appear across one of the voltage dividers selected by the storage flip-flops in accordance with the set states thereof and the transmitted pulse code pattern.

As previously mentioned, means are provided for rendering inoperative speed control amplifier 73 if there should be a change in the transmitted, and therefore the received code pattern. FIG. 8 illustrates a manner in which this may be accomplished. The speed control lockout circuitry 97 comprises a capacitance 109 resistance 110 network connected to each of storage flips-flops 90, 91 and 92 which remember the state of each of the flip-flops. In any state of flip-flops 90, 91 and 92, the capacitances 109 connected thereto will charge in a given direction. If the state of any of storage flip-flops 60, 61 or 62 should be changed, the capacitance-resistance network connected thereto will transmit a pulse to input terminal 104 of OSM 98, which upon firing thereof will connect the collector of transistor T9 to ground for a predetermined length of time. As illustrated, it would be clamped for 20 milliseconds. This action thereby prevents conduction of transistor T9 in speed control amplifier 73 and no voltage appears across the voltage dividers of translator 74. This speed control lockout arrangement will be further discussed hereinafter.

Means are provided to reject any spurious or external signal which might initiate generation of a series of interrogate pulses and erroneously change the state of a storage flip-flop. Such means function to verify the validity of a received pulse, initiating a valid pulse code pattern. FIG. 9 is illustrative of the pulse width detector 76 of FIG. 5. Pulse width detector 76 comprises serially arranged transistors T10 and T11 which in effect comprise a coincidence or "and" gate. It will be noted that the transistor T10 receives a negative going gating signal from speed control gating OSM 85 of 1.5 millisecond duration at the base thereof and the base of transistor T11 receives a positive going pulse input from pulse shaper and peak detector 75. When, and only when, transistors T10 and T11 are simultaneously rendered conductive by the application of simultaneous negative gating signals to their bases, a pulse signal will appear at the collector of transistor T11 and be transmitted to flip-flop 84 to supply a setting signal thereto. So long as the positive going pulse output of peak detector and pulse shaper 75 is off a minimum width predetermined by OSM 85, flip-flop 84 will not be set and interrogate OSM 79 may fire.

In this manner, pulse width detector 76 functions to detect the width of the first pulse of a code pattern and to reject any spurious or external signal from the serial pulse generator comprising OSM's 78–83. When a pulse of less than the predetermined time duration is detected by pulse width detector 76, a setting signal is applied to flip-flop 84 which sets flip-flop 84 in a state which will not allow interrogate OSM 79 to fire and commence generation of the serial interrogate pulses. Flip-flop 84 is reset, if, necessary, to the state which allows firing of interrogate OSM 79 by termination of the blanking pulse, waveform L, of clock OSM 77.

The pulses or bursts of the modulation frequency signal indicative of a pulse code pattern are detected and shaped into a pulse code pattern corresponding to the pulse pattern encoded at the transmitter by gates 45, 46, 47 and 48 and encoder 41. A pulse shaper and peak detector 75, schematically illustrated in FIG. 10 is provided for this purpose. The pulses or bursts of the modulation frequency signal, waveform J, are applied to the base of transistor T12 from amplifier 72. The positive going portions thereof produce amplifier action of normally conducting transistor T12, and the voltage at the collector of transistor T12 is integrated by capacitance 113 to produce a signal of waveform R at the base of transistor T13. This integrated pulse waveform is further amplified by transistor T13 and the ripples thereon smoothed by capacitance 114. Transistor T14 further amplifies the thus far shaped pulses and smooths the ripples therein by virtue of capacitance 115 and applies the shaped pulses to the base of transistor T15. Transistor T15 is pulse biased to saturation by the pulses appearing at the collector of transistor T14, and produces a pulse code pattern, waveform K, across resistance 116 corresponding to the pattern encoded at the transmitter. Capacitor 117 provides a spike filter. The shaped pulses are then applied to pulse width detector 76, clock OSM 77 and inverter 89 as heretofore explained.

For clarity of illustration, all of the pulse waveforms in FIG. 6 are shown as positive going, however, dependent on the relation of the various components of FIG. 5 and the point where the waveforms are taken, this is not necessarily the case.

Control logic

Control logic means are provided which receive information indicative of the commanded mode of operation of an actuated device, that is forward or reverse, the forward or reverse position of the actuating device and the magnitude of the displacement of an actuated device from a neutral or reference position. The actuated device may be an object such as controller 13, FIG. 2, or potentiometer arm 26, FIG. 2a. The control logic stores and monitors this information, compares the stored information with subsequent commands and interrelates such information to supervise the direction of motion and speed of the controlled device.

A general explanation of the control logic is now made with reference to FIG. 11. A command signal as stored in the storage flip-flops 90, 91 and 92 and selected by translator 74 is applied to the control logic networks for one of a plurality of actuating motors. It will be understood that translator 74, depending upon the states of the storage flip-flops 90 and 91 may select one of a plurality of actuating motors. However, for simplicity of disclosure, the control logic for only one of the actuating motors will be described. It will be understood that similar control logic will be provided for each actuating motor. Hereinafter, for purposes of discussion, it will be assumed that actuating motor 10 of FIG. 2 will be operated to actuate controller 13 and thereby control operation of drive motor 16.

A logic component 120 receives and stores information indicative of the forward-reverse position of the actuated device 13'. This may be accomplished through position-sensing switches 23 and 24, FIG. 2, as hereinafter described. The logic component 120 also receives information from forward-reverse, storage flip-flop 92 indicative of whether controller 13 is to operate in a forward mode or a reverse mode. This information is interrelated by component 120, together with a position error signal from comparator 121. Comparator 121 receives a position magnitude signal from position sensor 24 and a commanded speed or position signal from translator 74. Comparator 121 compares the actual position of the actuated device with a commanded position signal from translator 74 and signifies any error therebetween.

Comparator 121, together with logic component 120, logically selects the direction of operation of actuating motor 10' through actuating motor energizing circuits 122. Logic component 120, further supplies supervisory commands to the actuating motor energizing circuits 122 supplementary to the information supplied from comparator 121, as will be hereinafter described.

Elements of the control logic of FIG. 11 heretofore described are shown schematically in preferred form in FIG. 12 to which reference is now made. The forward and reverse fields of an actuating motor as exemplified by fields 11 and 12 of actuating motor 10, FIG. 2, are each connected in series with a switching transistor T1 and T2, respectively. Transistor T1 is turned on to permit energization of actuating motor 10 through forward field 11 when emitter follower transistor T17 is turned on. The base of transistor T17 is connected to the collector of a normally conductive transistor T18 having its base circuit selectively returned to −V from terminal 126 in a direction-control lockout circuit 147, as hereinafter explained. Should the potential at terminals 127 and 128 in circuit 147 rise to ground potential, transistor T18 will be turned off and the base of transistor T17, will move toward −V, transistor T17 will turn on, turning on transistor T1 and hence energize motor 10 through field 11 for forward operation thereof.

Transistor T2 is turned on when emitter follower transistor T20 is turned on and transistor T20 is turned on when normally conductive transistor T21, having its collector connected to the base of transistor T20 is turned off. The base of transistor T21 is returned to a terminal 129 which is selectively connected to −V or ground to thereby control conduction of transistor T21. Should terminal 129 approach ground potential, transistor T21 will be turned off which will result in transistor T20 turning on. When transistor T20 turns on, transistor T2 does also, and permits energization of actuating motor 10 through reverse field 12 and operation of actuating motor 10 in a reverse direction. The forward and reverse fields 11 and 12 of actuating motor 10 are energized in accordance with supervisory commands from translator 74, subject to the prior position and history of operation of the actuated device, which information is continuously received and stored by logic network 120.

The function of logic network 120 and the operation thereof is now described. Transistor T22 is arranged to detect, and turn on when the displacement of controller 13, with respect to a reference position, is greater than the position thereof called by the speed or position signal across voltage divider 105. To sense this condition, transistor T22 has its base connected to a terminal 130 at the collector of transistor T33 in comparator network 121, over a line 131. Transistor T22 is turned on when comparator network detects that the displacement of the actuated device, with respect to a neutral or reference position, is greater than the displacement called for by a speed signal, as evidenced by transistor T33 ceasing to conduct as will hereinafter be more fully explained.

Transistor T23, upon conduction thereof, calls for reverse operation of the actuated device, but is prevented from conducting when the actual position of the actuated device, with respect to a reference position is greater than the desired position and the actuated device is in a reverse position. Transistor T23 primarily functions to initiate movement of the actuating device in a reverse direction from a neutral or reverse position when reverse operation is commanded. Transistor T23 is turned on when a reverse command is called, however, it is back biased under certain conditions to prevent reverse operation of actuating motor 10, as will hereinafter be explained. When transistor T23 is turned on, the collector thereof is essentially at ground potential and is connected to terminal 132 thereby placing terminal 132 at ground and initiating energization of actuating motor 10 through reverse field 12, when terminal 128 is also at ground.

Transistor T24 conducts only when transistor T22 is turned on and the actuating device is in a forward position. The function of transistor T24 is to automatically return the actuating device towards a neutral or reference position should there be a decrease in or cessation of the speed signal across voltage divider 105. Transistor T24 can be turned on when the actuating device is in a neutral or forward position. Switch 23 in the emitter circuit of transistor T24 will be closed only when the actuated device is in a neutral or forward position. When transistor T24 is turned on, it places terminal 132 at ground in the same manner as does transistor T23.

Transistor T25 senses receipt of a command for reverse operation of the actuating device and coincidentally senses the actual position of the actuated device from a reference position being greater than the desired position. Transistor T25, upon sensing these conditions prevents transistor T23 from calling for reverse operation of the actuating device. Transistor T25 is turned on when these two conditions simultaneously exist. These conditions are signified by forward-reverse flip-flop 92 being set in a state indicative of a reverse command, which turns on transistor T27 and permits energization of relay 92a and moves contacts 92b to −V, and when point 130 in comparator network 121 is at −V. Under these conditions the anodes of diodes 133 and 134 in the base circuit of transistor T25 are both at −V and the potential at the base of transistor T25 is set by voltage divider action at a negative potential. When contact arms 92b are at −V, the base of transistor T23 is also returned to −V through diode 135. However, upon conduction of transistor T25, diode 136, connected to the collector thereof, clamps point 137 close to ground and prevents conduction of transistor T23.

Transistor T26 senses when the actuated device is in a reverse position and the displacement of the actuated device, with respect to a reference position, is greater than the desired position. Transistor T26 also provides the same function as transistor T25 in preventing conduction of transistor T23. Transistor T26 is turned on when the actuated device is in a reverse position which closes sensing switch 24 and thus back biases diode 138, and when point 130 goes negative. When transistor T26 is conducting it clamps point 137 at essentially ground potential and thereby prevents conduction of transistor T23. Therefore, transistor T26 functions to prevent transistor T23 from calling for reverse operation of actuating motor 10 when the actuated device is in a reverse position and the reverse position is greater than the position called for by the signal across voltage divider 105. It may be noted that the base of transistor T26 is connected to point 130 in the comparator network 121 over line 131, through diode 139. Transistor T26, it will thus be seen, acts as an "and" or coincidence gate to detect the aforementioned conditions when both of diodes 138 and 139 are back biased.

It may thus be seen that the conductive condition, that is, conducting or non-conducting states of the transistors of logic network 120 store information relative to the history of operation of the actuated device. It may be noted that relay 92a controls four contacts while only one is utilized in logic network 120. It will be understood that the illustrated unused contacts are arranged to be connected to other control logic systems, as illustrated in FIG. 12, for each actuating motor of a controlled apparatus. For example, the unused contacts might lead, in the case of an overhead crane to the control logic for operation of the boom and operation of the bridge thereon, etc.

Means are provided for cooperation with the control logic to provide an indication of the displaced position of an actuated device from a neutral or reference position. A position sensor 24 is provided which, as illustrated, comprises a transformer 140 producing an alternating current voltage across a potentiometer resistance 14. Potentiometer arm or contact 142 is arranged to be operatively connected to an actuated device 13" such as controller 13, FIG. 2, or potentiometer arm 26, FIG. 2a, and thus be moved on potentiometer 141 from a reference or neutral position in accordance with movement and therefore position of the actuated device. The signal picked off potentiometer arm 142 is applied through a half-wave rectifying diode 143 to the base of transistor T28. A peak detector and filter network 144 comprising a capacitance and resistance is provided between diode 143 and the base of transistor T28. The conductivity of transistor T28 will increase proportional to the displacement of arm 142 from the mid-point of potentiometer 141. As the conductivity of transistor T28 increases, the potential at the collector thereof increases in a positive direction toward ground which back biases transistor T29 thereby rendering it less conductive. As the conductivity of transistor T29 decreases, the potential at the collector thereof increases in a negative direction thereby increasing the forward bias of transistor T30. As the conductivity of transistor T30 increases, the voltage drop across voltage divider 144 in the emitter circuit thereof increases. The voltage which appears across voltage divider 144 is indicative of the position of the actuated device with respect to a neutral or reference position and may be compared with the speed signal appearing across voltage divider 105. Voltage dividers 105 and 144 are preferably identical and each have a tap thereon 105a and 144a, respectively, for comparison of the voltages thereacross.

Comparator network 121 compares the speed signal from speed control amplifier 73 and the position signal from position sensor 25, and provides an output signal indicative of which input signal is greater. The emitters of transistors T31 and T32 are connected to taps 105a and 144a, respecively, and the bases of transistors T31 and T32 are connected through diodes 145 and 146 so that transistors T31 and T32 are arranged to provide a comparison of the voltages at points 105a and 144a. Transistors T31 and T32 are normally non-conductive and have their collectors connected to the bases of transistors T33 and T34, respectively, which are normally biased to saturation. As previously pointed out, the collector of transistor T33 is connected at point 130 over line 131 to the base of transistor T22 and the anodes of diodes 133 and 137 in logic network 120. In operation of the comparator network 121, as thus far described, it will be seen that if point 105a becomes more negative than point 144a transistor T32 will turn on. In a similar manner, if point 144a becomes more negative than point 105 transistor T31 will turn on. If transistor T31 turns on, the voltage at the collector thereof increases in a positive direction back biasing transistor T33 and causing it to turn off. Similarly, if transistor T32 becomes conductive the voltage at the collector thereof increases in a positive direction thereby increasing the voltage at the base of transistor T34 and turning transistor T34 off. When either of transistors T33 or T34 are turned off the potential at the collectors thereof will approach −V. The collector of transistor T33 is connected through diode 148 to the base of a transistor T35. The collector of transistor T34 is connected to the base of transistor T35 through diode 148$^1$. When transistor T33 is turned on, the collector thereof is connected essentially at ground. When transistor T34 is turned on, the collector thereof is essentially at ground. Transistor T35 will be non-conductive so long as both of transistors T33 and T34 are conducting. However, if either of transistors T33 or T34 is turned off, the base of transistor T35 is returned to −V and transistor T35 turns on.

When transistors T33 and T34 are both turned on indicating that the speed signal and the position signal are equal, the collector of transistor T35 and point 128 in circuit 147 are at −V. At this time the base of transistor T21 and point 129 are returned to −V through diode 151. Therefore, transistor T21 will be turned on and transistors T20 and T2 will be turned off, thus locking out field 12 and preventing reverse operation of motor 10.

Under the same conditions, transistor T36 is turned on, but the base of transistor T18 is returned to −V through point 26 and diode 153, thus turning on transistor T18 and locking out forward field 11, preventing forward operation of motor 10.

To consider the operation of the control logic network of FIG. 12, assume that the transmitter of FIG. 3 is reiteratively transmitting a pulse code pattern 1100 which is indicative of a command for forward operation of an actuated device. The pulse code pattern 1100 is received by the receiver and code converter of FIG. 5 and also applied to the speed control amplifier and translator, as illustrated in FIG. 7. The translator is set by storage flip-flops 90 and 91 in accordance with the second and third pulses of the 1100 pulse code pattern. The speed control amplifier operating on the first pulse of the pulse code pattern determines the magnitude of the modulation frequency signal, and the fourth pulse or absence thereof is noted by forward-reverse storage flip-flops 92 which leaves transistor T27 turned off and therefore contacts 92b controlled by relay 92a are set at ground. Under these conditions, the translator 74 will be set up, as shown in FIG. 7, and voltage divider 105 thereof will be connected to the last stage, transistor T9 of speed control amplifier 73. Thus, current will flow from ground through voltage divider 105 of a magnitude dependent on the conductivity of transistor T9 and hence the amplitude of the modulation frequency signal as set by potentiometer 45, FIG. 3. Let it be further assumed that the device to be actuated is controller 13, FIG. 2, and controller 13 is initially in a neutral position and drive motor 16 is not energized. When controller 13 is actuated to move in a forward direction to increase the speed of motor 16, hook 21 will be lowered.

Under the conditions specified, the system, as far as hook 21 is concerned, is at rest and none of the transistors of logic network 120 are turned on. When a speed signal appears across voltage divider 105, the speed signal actually being indicative of the desired speed of motor 16 and therefore the position of controller 13, point 105a on voltage divider 105 will go negative with respect to point 144a on voltage divider 144. Therefore, current will flow from ground through a portion of voltage divider 144 toward point 105a. This turns transistor T32 on, and as the potential at the collector thereof decreases, transistor T34 is turned off. When transistor T34 is turned off, the collector of transistor T35 is returned to —V. Thus, the base of transistor T35 is returned to —V through diode 148[1] and transistor T35 turns on. When transistor T35 turns on, the collector thereof goes to ground and point 128 will be at ground potential. With point 128 at ground and transistor T36 turned on, grounding point 127, the potential at point 126 cannot go below ground. Therefore, the base of transistor T18 is back biased and transistor T18 turned off. When transistor T18 turns off transistor T17 and transistor T1 turn on thereby energizing forward field 11 and producing forward rotation of actuating motor 10 and controller 13. As controller 13 moves in a forward direction it closes forward contactors 17 in the armature circuit of drive motor 16 and commences shunting resistance 15 from the armature circuit of motor 16 to thereby increase the speed of motor 16, which produces lowering of the hook 21 at an increasing rate dependent on the position of controller 13.

As the position of controller 13 increases in a forward direction, point 144a on voltage divider 144 goes negative. Thus, when controller 13 has reached the position called for by the speed control amplifier, there will be no difference in potential between points 105a on voltage divider 105 and point 144a on voltage divider 144. Transistor T32 will turn off which turns transistor T34 back on, which turns transistor T35 off. Therefore, the base of transistor T18 is returned to —V through point 126 and diode 153, transistor T18 turns off, transistors T17 and T1 turn off and forward field 11 is de-energized. Thus, motor 10 ceases to advance in a forward direction. At this time, so long as there is no change in the amplitude of the modulation frequency signal and no change in the pulse code pattern, hook 21 will be lowered at a constant speed determined by the position of controller 13.

Let it be assumed that it is now desired to cease lowering hook 21 or to lower it at a lesser speed. To lower hook 21 at a lesser speed, the amplitude of the modulation frequency signal is decreased. To cease lowering of hook 21, the pulse code pattern 1100 may have its transmission interrupted by opening swich 60. Under either condition the magnitude of the speed signal is decreased or the speed signal is eliminated. Thus, point 144a on voltage divider 144 will be more negative than point 105a on voltage divider 105. Transistor T31 will be turned on and transistor T33 will turn off. Transistor T35 will turn on and point 128 will be at ground.

Inasmuch as the controller 13 is in a forward position, switch 23 in logic network 120 is closed. Since the collector of transistor T33 which is turned off is at —V, point 130 will be at —V as will the base of transistor T22. Transistor T22 will be turned on and allow transsistor T24 to turn on. At this time transistors T23, T25 and T26 are turned off. When transistor T24 turns on, the collector thereof is essentially at ground potential which will place point 132 at ground potential by virtue of the connection of line 149 thereto. This places the base of transistor T21 at ground thereby turning off transistor T21 and turning on transistors T20 and T2. When transistor T2 is turned on, reverse field 12 is energized and motor 10 operates in a reverse direction, driving controller 13 toward a neutral position which will shut down drive motor 16. As controller 13 returns toward a neutral position, the voltage across voltage divider 144 decreases until there is no difference in potential between points 144a and 105a, at which time transistor T31 will turn off and allow transistor T33 to turn on. When transistor T33 turns on, point 128 is returned to —V to thereby lock-out actuating motor 10.

When transistor T24 turns on, terminal 132 and the base of transistor T36 are connected to ground. Therefore, transistor T36 is turned off and the base of transistor T18 is returned to —V through diode 152 thereby preventing energization of motor 10 through forward field 11.

The speed of drive motor 16 may be reduced by returning controller 13 towards a less forward position. Similarly, drive motor 16 may be halted by decreasing the amplitude of the modulation frequency signal to zero or if a transmission failure occurs the controller 13 is automatically returned to a neutral position from a forward position. It may thus be seen that means are automatically provided for returning the actuated device to a neutral position in the event of cessation of a reiteratively transmitted pulse code pattern.

A change in the pulse code pattern transmitted will also cause and actuated device to be returned to a neutral position. It will be recalled that the code verifier illustrated in FIG. 8 senses any change to trigger speed control lock-out OSM 98 which will ground the collector of transistor T9 in speed control amplifier 73, FIG. 7, for a predetermined period of time and prevent the application of a speed control signal to the control logic means.

Thus, the pulse code pattern verifying means of FIG. 8 also provides means for returning the actuated device to a neutral position in the event of a change in pulse code pattern.

To illustrate operation of the actuating device in a reverse mode, let it be assumed that the transmitter of FIG. 3 is reiteratively transmitting a 1101 pulse code pattern which sets forward-reverse storage flip-flop 92 in a state indicative of a command for operation of motor 10 in a reverse direction. Transistor T27 will be biased on, thus energizing relay 92a and closing contacts 92b at —V. When this occurs, the base of transistor T23 will be connected to —V through diode 133 and transistor T23 will turn on. When transistor T23 is turned on the collector thereof is placed essentially at ground potential as is point 132. Transistor T32 will sense the speed signal across voltage divider 105 and cause transistor T35 to conduct and ground point 128. When points 132 and 128 go to ground, transistor T21 is turned off and hence transistors T20 and T2 are turned on, permitting energization of actuating motor 10 through reverse field 12, initiating reverse operation of controller 13, and operation of drive motor 16 in a direction to raise hook 21. Thereafter, controller 13 will advance in a reverse direction to a position called for by the magnitude of the speed control signal. As controller 13 advances toward this position, the conductivity of transistor T30 in position sensor 24 increases and the potential difference between points 144a and 105a on voltage dividers 144 and 105, respectively, decreases and transistor T32 no longer conducts.

When transistor T32 turns off, transistor T34 turns on and turns off transistor T35. Point 128 is then returned to —V and both motor circuits are locked out.

If for any reason as previously discussed in conjunction with forward operation of actuating motor 10, there should be a cessation of the reiteratively transmitted pulse code pattern, point 105a on voltage divider 105 will go positive with respect to point 144a on voltage divider 144 in a manner previously explained and transistor T31 will turn on. When transistor T31 turns on, transistor T33 turns off, and transistor T35 turns on setting point 128 at ground. At this time switch 24 in the base of transistor T26 is closed, back biasing diode 138 and the anode of diode 139 is returned to —V through point 130. Therefore transistor T26 turns on, effectively grounding the collector thereof and point 136, which holds transistor T23 off. With transistor T23 off, the base of transistor T21 is returned to —V through point 132 and diode 150. When point 132 is at —V, transistor T36 turns on and point 127 goes to ground. Therefore, point 126 will be at ground and transistor T18 turns off. Transistors T17 and T1 then turn on, and actuating motor 10 is energized through forward field 11. Actuating motor 10 will drive controller 13 toward the neutral or reference position and the potential at point 144a increases towards ground. When controller 13 reaches the neutral position, transistor T31 turns off, transistor T33 turns on, and switch 24 opens, turning off transistor T26. The bases of both of transistors T18 and T21 will be returned to —V and actuating motor 10 will be de-energized and drive motor 16 will be de-energized.

It may thus be seen that, in either direction of operation, should there be a cessation of the transmitted pulse code pattern due to any reason or should the speed control amplifier be blocked by change of a pulse code pattern, the actuating motor 10 is automatically operated to return the actuating device, control 13, to a neutral position to interrupt operation of drive motor 16.

It will be apparent that transistor T35 senses when actuating motor 10 should be energized regardless of the direction of operation thereof. Transistor T35 detects when either of transistors T33 or T34 turn off and grounds point 128 in response thereto.

If logic network calls for operation in a reverse direction, point 132 is grounded by conduction of transistor T23 or T24, which grounds the base of transistor T35 thereby returning the base of transistor T18 to —V through diode 152 and point 127, to thereby lock out forward field 11.

If neither transistor T23 or T24 are conductive, point 132 is at —V and transistor T35 is turned on grounding point 127. Also, the base of transistor T21 is returned to —V through diode 150. Under these conditions any command for energization of activating motor 10 results in transistor T35 turning on and grounding point 128, thereby producing energization of forward field 11. Thus, the control logic of FIG. 12 is normally set for forward operation.

In view of the foregoing descriptions of operation of actuating motor 10 and the apparatus controlled thereby including actuating device, controller 13 and drive motor 16, the operation of the control logic when actuating motor 10 is in a forward position and reverse operation is commanded and when controller 13 is in a reverse position and either forward or reverse operation commanded, is believed to be apparent. Also, it will be apparent that should the controller 13 be in a reverse position and forward direction of operation commanded or in forward position and reverse direction of operation commanded, such command for a change of position can only be accomplished through a change in the transmitted pulse code pattern. Therefore, when the pulse code pattern is changed such change will be detected by the speed control lockout means (FIG. 8), resulting in firing of speed control lock-out OSM 98 and blocking of speed control amplifier 73 by connecting the collector of transistor T19 to ground. Therefore, controller 13 will automatically be returned towards the neutral position prior to the new command for operation in a reversing direction becoming effective. If it should be desired, the firing period of speed control lock-out OSM 98 may be predetermined to be the time required for controller 13 to return to a neutral position from either its most forward or most reverse position. In this manner it may be assured that controller 13 will always commence initiation of a new command from a neutral position, which insures additional precision and accuracy of positioning of controller 13.

It has now been made apparent that a control system embodying the invention has all the precision and accuracy inherent in a digital control system in selecting a given mode of operation of one of a plurality of actuating devices and additionally possesses the versatility of an analogue system through use of the amplitude of the moduation frequency signal as a means of controlling the position of an actuating device and hence the speed of the apparatus controlled thereby.

The pulse width detection arrangement shown in FIGS. 5 and 9 provides means for validating the existence of a valid pulse code pattern. By making the pulses comprising a pulse code pattern of a predetermined minimum width and verifying that the received pulses are of that minimum width, the system is insensitive to spurious or external pulses. Moreover, the provision of the verification and lock-out means, as illustrated in FIG. 8, continuously verifies the receipt of and detects any change in a reiteratively transmitted pulse code pattern, and disables operation of a selected device in the event of a change in the pulse code pattern. Means are further provided for automatically returning a selected actuated device to a neutral position and thereby interrupting operation of a device controlled thereby, should there be any change in the transmitted pulse code pattern or cessation thereof. Moreover, the utilization of a first pulse of a pulse code pattern, which must always be present for operation of a selected device for code verification and speed or position control, provides a control system versatility not heretofor known to be obtained.

A control system embodying the invention is relatively inexpensive as compared to a frequency modulation, frequency shift-keying system wherein local oscillators and discriminators are required for each discrete frequency transmitted. In a system embodying the present invention, only one carrier frequency and one modulation frequency signal are utilized. For the control system to handle additional control devices, it is only necessary to add an additional pulse to a generated pulse pattern together with complementary expansion of the code converter and translator to handle more controlled devices. In the embodiment of the invention disclosed it will be noted that three outputs are taken from the translator together with an additional signal, the 1001 pulse code pattern, assuming that the 1000 pulse pattern is not utilized, however if a five-pulse, pulse code pattern were to be utilized which would require the use of four storage flip-flops, a total of seven discrete outputs could be obtained together with an additional function, assuming that the 1000 pulse code pattern would not be utilized.

While circuit elements such as the OSM's, flip-flops and coincident gates may take any suitable circuit form, and generally comprise "hardware" well known to those skilled in the art, typical examples of such circuits are briefly set forth for clarity and completeness of disclosure.

FIG. 13 illustrates a typical OSM 160 which may be utilized in the disclosed system embodying the invention. In OSM 160, transistor T36 is normally conducting and transistor T37 is normally turned off. If a positive pulse should be applied to terminal 161, the base of transistor T36 will be backed-biased and transistor T36 will be turned off at which time the collector thereof is returned to —V. When this occurs, the base of transistor T37, by voltage divider action, is set a minus potential and T37 turns on, producing a positive going voltage at the collector thereof. While transistor T37 is turned on and conducting, capacitor C1 discharges through resistor R1 to —V until such time as the potential at point 162 is insufficient to back-bias transistor T36. At this time transistor T36 turns on and the positive going increase in voltage at the collector thereof turns off transistor T37 which causes the collector of transistor T37 to return toward —V.

This action provides a positive going pulse output at terminal 163, which is initiated by the positive going pulse applied to terminal 161. However, the time duration of the pulse output at terminal 163 is dependent on the time constant of capacitor C1 and resistor R1 and hence their capacitance and resistance values, respectively. It will be apparent that when transistor T36 is conducting, the collector thereof is essentially at ground. Therefore, when transistor T36 is turned off, capacitor 164, connected to the collector thereof will transmit a negative going pulse to terminal 165. Similarly, when transistor T36 is again turned on, capacitor 164 will transmit a positive going pulse to terminal 165. Therefore, besides generating a positive going pulse at terminal 163, which might be utilized to form a portion of the output of a serial pulse generator, OSM 160 may be additionally utilized to provide triggering signals to other circuits when transistor T36 is turned off and when it is turned on.

A typical flip-flop 170 having two stable states of conduction is illustrated in FIG. 14. For purposes of explanation, transistor T38 may be considered to be conducting in the so-called "set" state and transistor T39 conducting in the so-called "reset" state. In operation, transistor T38 is normally conducting and the collector thereof is essentially at ground potential. Inasmuch as the collector of transistor T38 is at ground potential, the base of transistor T39 by connection thereto is also at essentially ground potential and transistor T39 is turned off. In the absence of any external stimuli, transistor T38 will continue to conduct. However, if a positive going pulse is applied to the base of transistor T38 at point 171 to "set" flip-flop 170, transistor T38 will turn off and the collector thereof will be returned to a negative potential as will the base of transistor T39. Therefore, when transistor T38 turns off, transistor T39 turns on. Transistor T39 will also continue to conduct unless flip-flop 170 is acted upon by an external stimuli. In this instance, flip-flop 170 may be "reset" by application of a positive going pulse to terminal 172 to turn off transistor T39. When this occurs, the collector of transistor T39 is returned to a negative potential as is the base of transistor T38 and transistor T38 again turns on and the flip-flop is "reset." It will be noted that transistors T38 and T39, acting as switches, may be utilized to connect a terminal selectively either to ground or to a negative potential and its application in the system heretofore described will be apparent, particularly in conjunction with turning on transistor T27, FIG. 12.

FIG. 15 illustrates typical "and" gates as they may be utilized in conjunction with the serial generator 49 of FIG. 3. In this respect, transistors T40, T41, T42 and T43 are illustrated as representing coincident or "and" gates 45, 46, 47 and 48, respectively, of the transmitter of FIG. 3. Each of transistors T40–T43 are arranged to be turned on upon coincidence of application of a negative potential to the bases thereof and a positive pulse to the emitters thereof, which may be derived from associated OSM's of serial pulse generator 49. In this manner, transistors T40–T43 and also transistor T44 are sequentially and selectively turned on to produce a serial pulse pattern or pulse code pattern across the collector resistance of transistor T44. Therefore, when point 174 goes in a positive direction due to the turning on of transistors T40–T43, transistor T44, normally turned on, will be turned off and negative going pulses will appear at point 175 connected to the collector thereof, which negative going pulses may be utilized to gate power amplifier 50.

It may be seen that the transistors forming the "and" gates of FIG. 15 are arranged to provide an output upon coincidence of positive and negative going signals. However, as will be apparent, "and" gates may be provided which provide an output indicative of the coincidence of two or more signals of any polarity. For example, the pulse width detector of FIG. 9 provides an output in response to coincidence input of two negative going signals.

It will be understood that the circuits of FIGS. 13, 14 and 15 are provided for purposes of illustration only and the specific circuitry of the various OSM's, flip-flops and logic circuitry, including "and" gates illustrated in both block and schematic form in disclosing a system embodying the invention are given for purposes of illustration and example only. Other circuits designed to provide the same functions will be known and become apparent to those skilled in the art.

In various schematic diagrams and diagrams which are schematic in part, values of circuit components, particularly resistors, have been given to simplify discussion thereof. It is to be understood that these component values are set forth only for purposes of illustration and particularly to illustrate the biasing and switching voltages of the transistors, and practice of the invention is not limited to these particular circuit arrangements. In the schematic diagrams, +V may be considered to be 3 volts and —V considered to be —20 volts.

It will be seen that the objects of the invention set forth, together with those made apparent from the preceding description of a control system embodying the invention are efficiently attained. While a preferred embodiment of the invention has been illustrated and described, modifications and changes thereto, as well as other embodiments thereof, may occur to those skilled in the art which do not depart from the spirit and scope of the invention. Therefore, it is intended that all matter contained in the foregoing description and shown in the accompanying drawings are to be interpreted as illustrative and not in a limiting sense. Accordingly, it is intended that the appended claims cover all embodiments and modifications of the invention which do not depart from the spirit and scope of the invention.

What is claimed is:

1. A system for controlling the position of a plurality of actuated devices with respect to a reference position comprising an actuating motor operable in forward and reverse directions for driving each actuated device, means for selecting the direction of operation of each of said actuated devices; means responsive to said selecting means for reiteratively generating a pulse code pattern of a carrier signal amplitude modulated with a modulation frequency signal and indicative of the selected device, its direction of operation, and a commanded position therefor, the commanded position of the selected device being determined by the degree of modulation of the carrier signal, the direction of operation being determined by the presence or absence of a last pulse of the generated pattern, and the selection of the device being determined by the presence or absence of pulses intermediate the first and last pulses of a pulse code pattern; means for detecting the modulation frequency pulses from the amplitude modulated carrier pulses; shaping means for generating a rectangular pulse pattern corresponding to the modulation frequency pulse pattern; converter means for generating an interrogate pulse pattern having a pulse corresponding in time to each possible pulse of the pulse code pattern, excepting the first; storage means having two stable states of operation and corresponding in number to the number of interrogate pulses; coincidence means corresponding in number to said storage means and actuated by coincidence in time of a present pulse of the code pattern and an interrogate pulse, each of said coincidence means being effective to set one of said storage means in a first of its states dependent upon time coincidence of an interrogate pulse and a code pattern pulse whereby the states of storage means represent the generated pulse code pattern, excepting the first pulse thereof; translating means actuated by said storage means in accordance with the states thereof to provide a circuit corresponding to a desired actuated device; amplifier means responsive to the first modulation frequency pulse of a code pattern for generating a position signal proportional in magnitude to the amplitude of the modulation frequency signal and means for applying the generated signal to said circuit provided in said translating means, the magnitude of the generated signal being indicative of the desired displacement of the selected actuated device from a reference position; means for generating a displacement signal proportional in magnitude to the displacement of the actuated device; and means responsive to the position signal for energizing the actuating motor of the selected actuated device to move said actuated device until the displacement signal reaches a magnitude having a predetermined relation to the magnitude of the position signal.

2. The system of claim 1 including means for changing the states of said storage means in accordance with a change in the reiteratively generated pulse code pattern.

3. The system of claim 2 including means for detecting a change in the states of said storage means and preventing application of the position signal to the provided circuit in the event of a change in the reiteratively generated pulse code pattern.

4. The system of claim 3 further including means for energizing the actuating motor of the selected actuating device for operation of the selected actuated device toward the reference position upon cessation of application of the position signal to said translating means.

5. A system for controlling the position of a plurality of actuated devices with respect to a reference position comprising an actuating motor operable in forward and reverse directions for driving each actuated device, each of said actuating motors having forward and reverse circuits selectively energizable to determine the direction of operation thereof, means for selecting the direction of operation of each of said actuated devices; means responsive to said selecting means for reiteratively generating a pulse code pattern of a carrier signal amplitude modulated with a modulation frequency signal and indicative of the selected device, its direction of operation and a commanded position, the commanded position of the selected device being determined by the degree of modulation of the carrier wave, the direction of operation being determined by the presence or absence of a last pulse of the generated pattern, and the selection of the device being determined by the intermediate pulses of a pulse code pattern; shaping means for generating a rectangular pulse pattern corresponding to the modulation frequency pulse pattern; converter means for generating an interrogate pulse pattern having a pulse corresponding in time to each possible pulse of the pulse code pattern, excepting the first; storage means having two stable states of operation and corresponding in number to the number of interrogate pulses; coincidence means corresponding in number to said storage means and actuated by coincidence in time of a present pulse of the code pattern and an interrogate pulse, each of said coincidence means being effective to set one of said storage means in a first of its states dependent upon time coincidence of an interrogate pulse and a code pattern pulse whereby the states of said storage means represent the generated pulse code pattern excepting the first pulse thereof; translating means actuated by said storage means in accordance with the states thereof to provide a circuit corresponding to a desired actuated device amplifier means responsive to the first modulation frequency pulse of a code pattern for generating a position signal proportional in magnitude to the amplitude of the modulation frequency signal and means for applying the generated signal to said circuit provided in said translating means, the magnitude of the position signal being indicative of the desired displacement of the selected actuated device from a reference position; means for generating a displacement signal proportional in magnitude of the displacement of the actuated device; and means responsive to the position signal for energizing the appropriate circuit of the actuating motor of the selected actuated device to move the selected device until the displacement signal reaches a magnitude having a predetermined relation to the magnitude of the position signal.

6. The system of claim 5 including an energizing circuit for the forward and reverse circuits of each of said actuating motors and logic means for selectively operating said energizing circuits to drive a selected device toward its reference position upon detection of a change in the generated pulse code pattern.

7. The system of claim 5 including an energizing circuit for the forward and reverse circuits of each of said actuating motors and logic means responsive to the state of the storage means indicative of the last pulse of a pulse code pattern for selectively operating said energizing circuits in accordance with the state of said storage means.

8. The system of claim 6 wherein said logic means is effective to prevent operation of one of said energizing circuits when the other is operated.

9. The system of claim 5 including comparator means for comparing the magnitudes of the position and displacement signals and providing an indication of the greater of the two signals, and means responsive to the indication for energizing appropriate circuit of the actuating motor for operation in a direction to eliminate the indication.

10. The system of claim 9 further including logic means sensitive to the position of the selected device with respect to a reference position and arranged to receive the indication from said comparator means, said logic means dependent on the position of the selected device from a reference position and the indication from said comparator means being effective to energize the appropriate circuit of said actuating motor until the indication is eliminated.

11. A system for controlling the position of a plurality of actuated devices with respect to a reference position comprising, means for selecting one of said devices for operation in a desired direction, means responsive to said selecting means for reiteratively generating a pulse code pattern indicative of the selected device and the desired direction of operation thereof, means for varying the amplitude of the pulses of the generated pulse code pattern, means responsive to the generated pulse code pattern for generating an actuating signal proportional in magnitude to the amplitude of the pulses of the generated pulse code pattern, means responsive to the generated pulse code pattern for selecting the desired device and its direction of operation and means for operating the actuated device to a position proportional in displacement from a reference position to the magnitude of the actuating signal.

12. The system of claim 11 including means for detecting cessation of the generated pulse code pattern and means for returning said actuated device toward the reference position in response to detection of cessation of the generated pulse code pattern.

13. The system of claim 12 wherein said actuated device is driven by an electric motor having means for selectively controlling its direction of operation.

14. The system of claim 11 wherein the generated pulse code pattern is utilized to operate an amplifier to pass bursts of an amplitude modulated carrier signal and transmit the generated pule code pattern, the degree of modulation of the carrier signal determining the magnitude of the actuating signal and hence the commanded position of said actuated device.

15. A system for controlling the position of a plurality of devices with respect to a reference position comprising means for reiteratively generating pulse patterns, means for selecting operation of one of said devices, means responsive to said selecting means for encoding the pulse patterns into pulse code patterns indicative of the selected device and the direction of operation thereof, transmitting means arranged to transmit an amplitude modulated carrier wave including means for varying the amplitude of the modulation frequency signal, said transmitting means being arranged to transmit pulses of an amplitude modulated carrier wave corresponding to the pulse code pattern, receiving means for receiving said transmitted pulses and detecting the modulation frequency therefrom, translating means responsive to said transmitted pulses for generating a position signal proportional in magnitude to the amplitude of the modulation frequency signal, converter means responsive to said transmitted pulses for selecting operation of the device indicated by the pulse code pattern and means for moving said selected device a distance from the reference position proportional to the magnitude of the position signal.

16. A system for controlling the position of a plurality of devices comprising means for reiteratively generating pulse patterns, means for selecting operation of one of said devices, means responsive to said selecting means for encoding the pulse patterns into pulse code patterns indicative of the selected device and the direction of operation thereof, transmitting means arranged to transmit an amplitude modulated carrier wave including means for varying the amplitude of the modulation frequency signal, said transmitting means being arranged to transmit pulses of an amplitude modulated carrier wave corresponding to said pulse code pattern, receiving means for receiving said transmitted pulses and detecting the modulation frequency signal therefrom, means for generating an actuating signal proportional in magnitude to the amplitude of the modulation frequency signal, means for shaping the modulation frequency pulses into rectangular pulses, converter means responsive to the pattern of the shaped rectangular pulses for selecting operation of the device indicated by the pulse code pattern, means for moving said selected device a distance from a reference position proportional to the magnitude of the generated signal, said converter means including storage means having two stable states of operation for being set in states of operation indicative of the pulse code pattern, and means responsive to a change of state of said storage means to interpret the actuating signal.

17. The system of claim 16 wherein said converter means includes means for verifying the validity of the shaped rectangular pulses and rejecting any spurious signals.

18. The system of claim 16 including means responsive to the states of said storage means for selecting the desired device.

19. The system of claim 16 wherein said means for generating a proportional signal is responsive only to the first pulse of a pulse code pattern and is rendered inoperative in the absence of a first pulse in a pulse code pattern.

20. A system for controlling the position of a plurality of devices in forward and reverse directions from a reference position comprising, means for reiteratively generating a pulse code pattern of a carrier wave modulated with a modulation frequency signal indicative of a selected device and the desired direction of operation thereof, means for varying the amplitude of the modulation frequency signal, means responsive to the generated pulse code patterns for choosing the selected device and the direction of operation thereof, means for generating a position signal proportional in magnitude to the amplitude of the modulation frequency signal and indicative of the desired displacement of the selected device from a reference position, and means responsive to the position signal for moving the selected device to a position determined by the magnitude of the position signal.

21. The system of claim 20 including means for generating a displacement signal indicative of the actual position of the selected device with respect to a reference position, comparator means for comparing the magnitudes of the position and displacement signals and providing an indication of differences therebetween, and means responsive to an indication of said comparator means for operating the selected device to a position to eliminate the indication.

22. The system of claim 21 wherein the devices are driven by actuating motors having forward and reverse circuits selectively energizable to determine the direction of operation thereof.

23. The system of claim 22 further including logic means arranged to sense the direction of displacement of the selected device from the reference position and arranged to receive the indication from said comparator means, said logic means dependent on the position of the selected device from a reference position and the indication from said comparator means being effective to energize the appropriate circuit of said actuating motor until the indication is eliminated.

24. The system of claim 20 including means for continuously comparing succeeding pulse code patterns and detecting changes therein, and means responsive to a change in a generated pulse code pattern for rendering inoperative said means for generating a position signal.

25. The system of claim 20 including means for continuously comparing succeding pulse code patterns and detecting changes therein, and means responsive to a change in a generated pulse code pattern for rendering inoperative said means for generating a position signal for a predetermined length of time.

26. A system for controlling the position of a plurality of devices in forward and reverse directions from a reference position comprising, means for selecting one of said devices for operation in a desired direction, means responsive to said selecting means for reiteratively generating a pulse code pattern of a carrier wave modulated with a modulation frequency signal indicative of the selected device and the desired direction of operation thereof, means for varying the amplitude of the modulation frequency signal, means responsive to the generated pulse code patterns choosing the selected device, means for generating a position signal proportional in magnitude to the amplitude of the modulation frequency signal and indicative of the desired displacement of the selected device from a reference position, means responsive to the position signal for moving the selected device to a position determined by the position signal, and means for detecting cessation of the generated pulse code pattern and producing movement of the selected device toward the reference position upon detection of cessation of the generated pulse code pattern.

27. A system for controlling the movement of a plurality of actuated devices with respect to a reference position comprising, means for selecting one of said devices for operation in a desired direction, means for generating a plurality of pulse code patterns, means responsive to said selecting means for reiteratively transmitting one of said pulse code patterns indicative of the selected device and the desired direction of operation thereof, receiving means responsive to the transmitted pulse code patterns for choosing the selected device and generating an actuating signal to produce operation of the selected device in the desired direction, means for detecting a change in the transmitted pulse code pattern, logic means for monitoring the direction of operation of said actuated device from the reference position and supervising the direction of operation of said actuated device toward the reference position upon cessation or change of the generated pulse code pattern.

(References on following page)

References Cited

UNITED STATES PATENTS

| | | | |
|---|---|---|---|
| 2,529,804 | 11/1950 | Harnischfeger et al. | 340—147 X |
| 2,557,581 | 6/1951 | Triman | 340—147 |
| 2,751,534 | 6/1956 | Jefferson et al. | 318—16 |
| 2,788,476 | 4/1957 | Shaw | 318—16 |
| 3,002,140 | 9/1961 | Bonner | 318—16 |
| 3,031,603 | 4/1962 | Hills | 318—16 |
| 3,037,169 | 5/1962 | Bishop | 332—9 |
| 3,110,850 | 11/1963 | Young | 318—16 |
| 3,263,141 | 7/1966 | Nicola | 318—16 |

BENJAMIN DOBECK, *Primary Examiner.*

N. C. READ, *Examiner.*

H. I. PITTS, *Assistant Examiner.*

UNITED STATES PATENT OFFICE
CERTIFICATE OF CORRECTION

Patent No. 3,348,108                                    October 17, 1967

Anthony D'Onofrio

It is hereby certified that error appears in the above numbered patent requiring correction and that the said Letters Patent should read as corrected below.

Column 2, line 33, for "preretermined" read -- predetermined --; column 11, line 33, for "my" read -- may --; column 18, line 32, for "and" read -- an --; column 24, line 63, for the claim reference numeral "12" read -- 11 --; line 69, for "pule" read -- pulse --; column 26, line 29, for "succeding" read -- succeeding --.

Signed and sealed this 7th day of January 1969.

(SEAL)
Attest:

Edward M. Fletcher, Jr.                               EDWARD J. BRENNER
Attesting Officer                                       Commissioner of Patents